US012354077B2

(12) United States Patent
Rule

(10) Patent No.: US 12,354,077 B2
(45) Date of Patent: Jul. 8, 2025

(54) MOBILE WEB BROWSER AUTHENTICATION AND CHECKOUT USING A CONTACTLESS CARD

(71) Applicant: Capital One Services, LLC, McLean, VA (US)

(72) Inventor: Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 116 days.

(21) Appl. No.: 17/847,961

(22) Filed: Jun. 23, 2022

(65) Prior Publication Data
US 2023/0419295 A1 Dec. 28, 2023

(51) Int. Cl.
G06Q 20/32 (2012.01)
G06Q 20/34 (2012.01)
G06Q 20/40 (2012.01)

(52) U.S. Cl.
CPC ....... *G06Q 20/3267* (2020.05); *G06Q 20/351* (2013.01); *G06Q 20/409* (2013.01)

(58) Field of Classification Search
CPC . G06Q 20/3267; G06Q 20/351; G06Q 20/409
USPC .......................................................... 705/44
See application file for complete search history.

(56) References Cited

U.S. PATENT DOCUMENTS

| 4,683,553 A | 7/1987 | Mollier |
| 4,827,113 A | 5/1989 | Rikuna |
| 4,910,773 A | 3/1990 | Hazard et al. |
| 5,036,461 A | 7/1991 | Elliott et al. |
| 5,363,448 A | 11/1994 | Koopman, Jr. et al. |

(Continued)

FOREIGN PATENT DOCUMENTS

| AU | 2014321178 A1 | 4/2016 |
| CA | 3010336 A1 | 7/2017 |

(Continued)

OTHER PUBLICATIONS

Q. H. Do, P. Hosseyni, R. Küsters, G. Schmitz, N. Wenzler and T. Würtele, "A Formal Security Analysis of the W3C Web Payment APIs: Attacks and Verification," 2022 IEEE Symposium on Security and Privacy (SP), San Francisco, CA, USA, 2022, pp. 215-234. (Year: 2022).*

(Continued)

*Primary Examiner* — Virpi H Kanervo
(74) *Attorney, Agent, or Firm* — KDW Firm PLLC

(57) ABSTRACT

A merchant page in a browser may receive selection of a first financial institution. The merchant page may generate a uniform resource identifier (URI) directed to an application. At least a portion of the URI may be registered with the application and the first financial institution in a mobile operating system. Responsive to receiving selection of the URI, the mobile OS may launch the application, which may authenticate credentials for an account. The application may associate the user ID parameter and the session ID parameter with the account and receive a cryptogram from a contactless card. The application may receive, from a server, an indication specifying the server verified the cryptogram. The OS may launch the browser, which may refresh the page. The refreshed page may include a virtual card number (VCN) in a first form field. A transaction may be processed based on the VCN.

20 Claims, 16 Drawing Sheets

(56) References Cited

U.S. PATENT DOCUMENTS

| | | |
|---|---|---|
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |

(56) References Cited

U.S. PATENT DOCUMENTS

| | | |
|---|---|---|
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 11,392,933 B2 * | 7/2022 | Mossler ............ G06Q 20/3223 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |

(56) References Cited

U.S. PATENT DOCUMENTS

| | | |
|---|---|---|
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |

(56) References Cited

U.S. PATENT DOCUMENTS

| | | |
|---|---|---|
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0247141 A1* | 8/2016 | Graylin .............. G06Q 20/3674 |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0337782 A1* | 11/2018 | Wu .......................... H04L 9/006 |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2020/0043003 A1* | 2/2020 | Corella ................. H04L 9/3268 |
| 2022/0247565 A1* | 8/2022 | Rule ..................... H04L 9/0897 |
| 2023/0105850 A1* | 4/2023 | Fletcher ........... G06Q 20/40145 |
| | | 705/44 |

FOREIGN PATENT DOCUMENTS

| | | | |
|---|---|---|---|
| CA | 3108917 A1 | 4/2020 | |
| CN | 101192295 A | 6/2008 | |
| CN | 103023643 A | 4/2013 | |
| CN | 103417202 A | 12/2013 | |
| CN | 111279336 A * | 6/2020 | ........... G06F 16/951 |
| EP | 1085424 A1 | 3/2001 | |
| EP | 1223565 A1 | 7/2002 | |
| EP | 1265186 A2 | 12/2002 | |
| EP | 1783919 A1 | 5/2007 | |
| EP | 2139196 A1 | 12/2009 | |
| EP | 1469419 A1 | 8/2012 | |
| EP | 2852070 A1 | 3/2015 | |
| GB | 2457221 A | 8/2009 | |
| GB | 2516861 A | 2/2015 | |
| GB | 2551907 A | 1/2018 | |
| KR | 101508320 B1 | 4/2015 | |
| KR | 20220035318 A * | 3/2022 | |
| WO | 0049586 A1 | 8/2000 | |
| WO | 2006070189 A2 | 7/2006 | |
| WO | 2008055170 A2 | 5/2008 | |
| WO | 2009025605 A2 | 2/2009 | |
| WO | 2010049252 A1 | 5/2010 | |
| WO | 2011112158 A1 | 9/2011 | |
| WO | 2012001624 A1 | 1/2012 | |
| WO | 2013039395 A1 | 3/2013 | |
| WO | 2013155562 A1 | 10/2013 | |
| WO | 2013192358 A2 | 12/2013 | |
| WO | 2014043278 A1 | 3/2014 | |
| WO | 2014170741 A2 | 10/2014 | |
| WO | 2015179649 A1 | 11/2015 | |
| WO | 2015183818 A1 | 12/2015 | |
| WO | 2016097718 A1 | 6/2016 | |
| WO | 2016160816 A1 | 10/2016 | |
| WO | 2016168394 A1 | 10/2016 | |
| WO | 2017042375 A1 | 3/2017 | |
| WO | 2017042400 A1 | 3/2017 | |
| WO | 2017157859 A1 | 9/2017 | |
| WO | 2017208063 A1 | 12/2017 | |
| WO | 2018063809 A1 | 4/2018 | |
| WO | 2018137888 A1 | 8/2018 | |

OTHER PUBLICATIONS

Q. H. Do, P. Hosseyni, R. Küsters, G. Schmitz, N. Wenzler and T. Würtele, "A Formal Security Analysis of the W3C Web Payment APIs: Attacks and Verification," 2022 IEEE Symposium on Security and Privacy (SP), San Francisco, CA, USA, 2022, pp. 215-234. (Year: 2022).*

Agrawal, Shobhit. "Integrating Digital Wallets: Advancements in Contactless Payment Technologies." International Journal of Intelligent Automation and Computing 4.8 (2021): 1-14. (Year: 2021).*

O. Zolotukhin and M. Kudryavtseva, "Authentication Method in Contactless Payment Systems," 2018 International Scientific-Practical Conference Problems of Infocommunications. Science and Technology (PIC S&T), Kharkiv, Ukraine, 2018, pp. 397-400. (Year: 2018).*

Smart Card Alliance. "Contactless payment and the retail point of sale: applications, technologies and transaction models." Smart Card Alliance. Princeton Junction, NJ. (Year: 2003).*

Shrestha, Babins, et al. "Theft-resilient mobile wallets: Transparently authenticating NFC users with tapping gesture biometrics." Proceedings of the 32nd Annual Conference on Computer Security Applications. (Year: 2016).*

(56) References Cited

OTHER PUBLICATIONS

Mehrnezhad, Maryam, Feng Hao, and Siamak F. Shahandashti. Tap-tap and pay (TTP): preventing man-in-the-middle attacks in NFC payment using mobile sensors. Computing Science, Newcastle University. (Year: 2014).*

V. Njebiu, M. Kimwele and R. Rimiru, "Secure Contactless Mobile Payment System," 2021 IEEE Latin-American Conference on Communications (LATINCOM), Santo Domingo, Dominican Republic, 2021, pp. 1-6. (Year: 2021).*

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_201206070619239000.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., " The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25,

(56) References Cited

OTHER PUBLICATIONS

2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card User Authentication for Contactless Smart Cards based on Gesture Recognition", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

The International Search Report and Written Opinion mailed May 9, 2023 for Int. App. No. PCT/US2023/022504 (14 pages).

The International Preliminary Report on Patentability issued Dec. 18, 2024 for Int. App. No. PCT/US2023/022504 (seven (7) pages).

Anonymous; "Uniform Resource Identifier - Wikipedia"; Oct. 10, 2011. Retrieved from the Internet: URL:https://en.wikipedia.org.w.index.php?title=Uniform_Resource_identifier&oldid=454892051.

\* cited by examiner

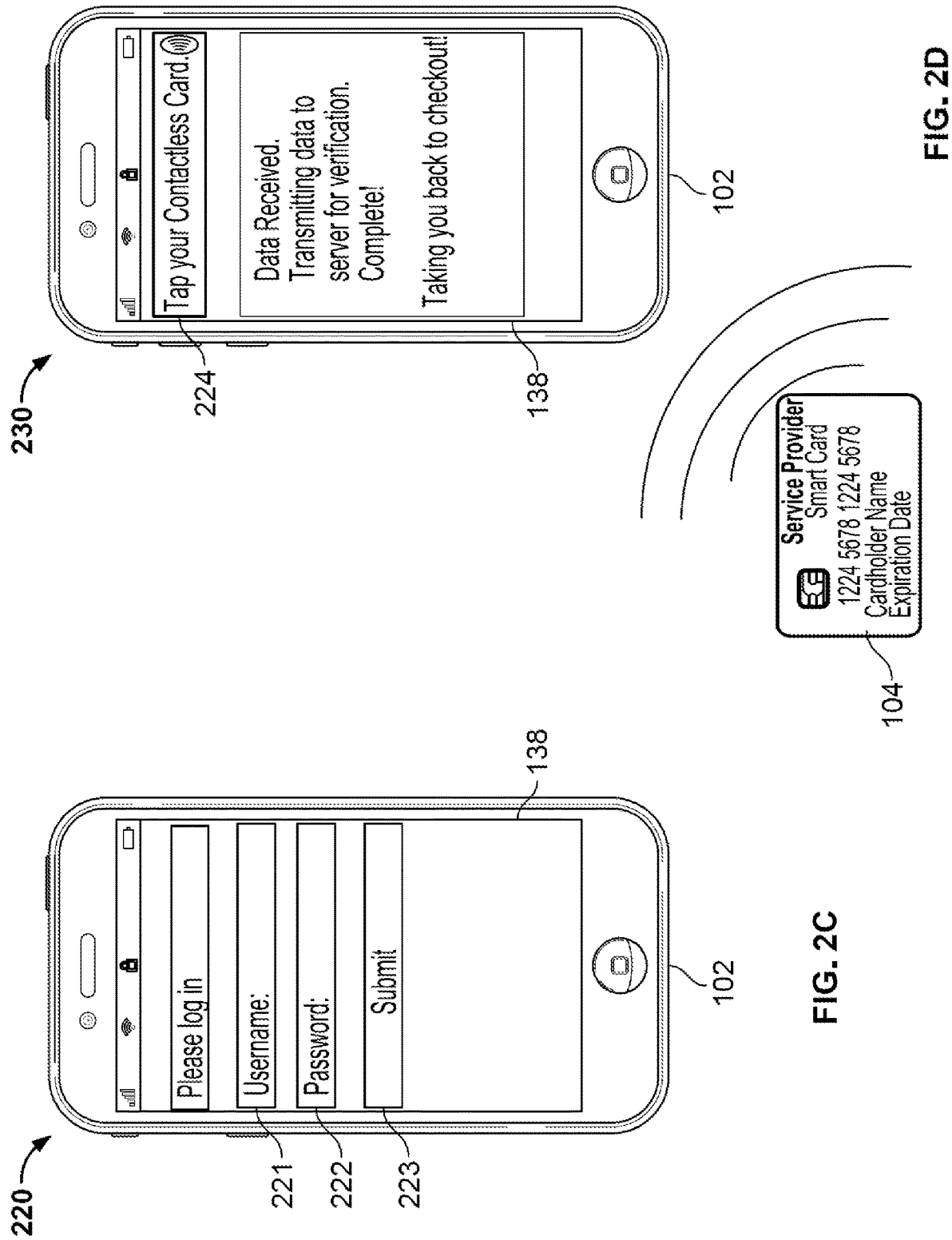

MOBILE WEB BROWSER AUTHENTICATION AND CHECKOUT USING A CONTACTLESS CARD

BACKGROUND

Account identifiers for payment cards may include long numeric and/or character strings. As such, it may be difficult for a user to manually enter the account identifier correctly. Indeed, users often make mistakes and enter incorrect account numbers into payment interfaces on computing devices. Additionally, processes have been developed that allow cameras or other malicious entities to capture and identify account identifiers entered in a device, thereby posing security risks. Furthermore, when an online transaction is processed using conventional techniques, the transaction is treated as a "card not present transaction," which may carry higher processing fees and greater risks of fraud.

SUMMARY

Systems, methods, apparatuses, and computer readable media for mobile web browser authentication and checkout using a contactless card. In one aspect, a method, includes receiving, by a merchant web page in a web browser executing on a processor of a mobile device, selection of a first financial institution of a plurality of financial institutions, where the merchant web page includes a plurality of form fields associated with a transaction, generating, by the merchant web page, a uniform resource identifier (URI) directed to an application, where the URI includes a merchant identifier (ID) parameter, a session ID parameter associated with the transaction, a user ID parameter, and an action ID parameter, where at least a portion of the URI is registered with the application and the first financial institution in a mobile operating system (OS) executing on the mobile device, responsive to receiving selection of the URI, launching the application by the mobile OS, authenticating, by the application, login credentials for an account associated with the first financial institution, associating, by the application, the user ID parameter and the session ID parameter with the account, receiving, by the application, a cryptogram from a contactless card associated with the account, receiving, by the application from a server, an indication specifying the server verified the cryptogram, launching, by the mobile OS based on the indication, the web browser, refreshing, by the web browser, the merchant web page, where the refreshed merchant web page includes a virtual card number (VCN) in a first form field of the plurality of form fields, and processing, by the merchant web page, the transaction based at least in part on the VCN in the first form field.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2C illustrates an aspect of the subject matter in accordance with one embodiment.

FIG. 2D illustrates an aspect of the subject matter in accordance with one embodiment.

DETAILED DESCRIPTION

Figure 1A:
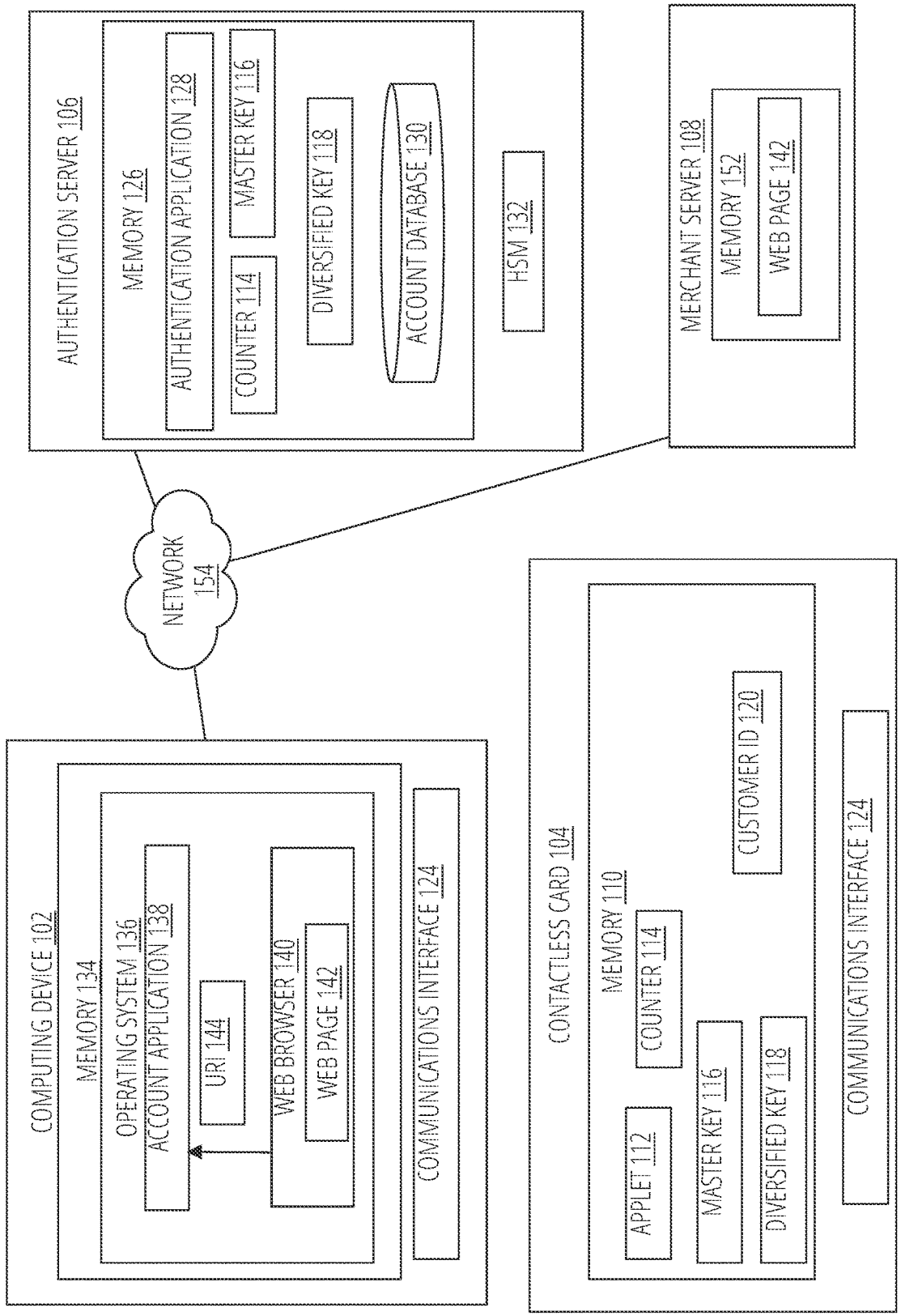
FIG. 1A illustrates an aspect of the subject matter in accordance with one embodiment.

Embodiments disclosed herein provide techniques to for secure authentication and checkout in applications using a contactless card. For example, a user may use a mobile web browser on a mobile device to add one or more items to their shopping cart for purchase. At a checkout page, the user may select an option to use an automated checkout process. The user may select a first financial institution from list of financial institutions presented by the web page. The web page may then generate, based on the selection, a uniform resource identifier (URI) that is directed to an application. The application may be registered with the first financial institution in a mobile operating system (OS). The application may be an account management application provided by the first financial institution. The browser may include, as parameters of the URI, a merchant identifier (ID) parameter, a user ID parameter, a session ID parameter, and an action ID parameter as parameters of the URI. The OS may process the URI to launch the application.

The application may process the parameters of the URI and determine to output, based on the action ID, an account authentication page of the application. The authentication page may include one or more functions to authenticate an account, such as via login/password, biometrics, and the like. Once authenticated, the account application may associate the user ID and the session ID with the account (e.g., in an account database stored by the application and/or a server). The application may then instruct the user to tap their contactless card to the device, which causes the contactless card to generate a cryptogram. The application may read the cryptogram and transmit the cryptogram to a server associated with the first financial institution for verification. The application may further the parameters of the URI to the server.

The server may then verify the cryptogram (e.g., based at least in part on decrypting the cryptogram). Once verified, the server may generate a virtual card number (VCN), an expiration date for the VCN, and a card verification value (CVV) for the VCN. The server may restrict use of the VCN to a merchant associated with the transaction based on the merchant ID. The server may then transmit the VCN, CVV, expiration date, and contact information (e.g., an account holder name, address, phone number, email address, etc.) to a server associated with the merchant. The server may further transmit the session ID and user ID to the merchant server. In at least one embodiment, the merchant ID comprises a URI that is directed to the merchant server. In other embodiments, the merchant server is identified based on the merchant ID.

The merchant server may receive the information from the server associated with the first financial institution, and identify the browsing session based on the session ID and/or user ID. The merchant server may then cause one or more form fields on the checkout page to be populated with the received information from the server. In some embodiments, the merchant server may push these values to the mobile web browser. In other embodiments, the merchant server causes the checkout page to be reloaded. Once reloaded, the form fields may include the payment information (e.g., VCN, expiration date, CVV) as well as any other personal information (e.g., name, address, email address, phone number, etc.) received from the server associated with the first financial institution.

Furthermore, the server associated with the first financial institution may transmit a decryption result to the account application. The decryption result may specify that the server verified (or decrypted) the cryptogram and generated the VCN. The decryption result may cause the account application to return the device to the mobile web browser. The checkout page may be refreshed in the web browser (e.g., by the merchant server and/or by the mobile device). Once refreshed, the payment information and personal information may be populated into the form in the web page. The user may then submit the form to process the payment in the web browser.

Advantageously, embodiments disclosed herein provide secure, automated, checkout processes using a contactless card. By leveraging cryptograms generated by contactless cards, embodiments of the disclosure may securely verify the identity of the user with minimal risk of fraudulent activity. Furthermore, doing so ensures that the automated checkout is only performed when the user has access to a contactless card that facilitates the cryptogram verification with the server. Moreover, certain restrictions imposed on the web browser may be avoided. For example, some operating systems and/or web browsers may not allow the web browser to directly communicate with the account application. Therefore, by using the VCN that is sent to the merchant's backend, these restrictions may be overcome, allowing payment information for a purchase to be automatically populated in a web form. Furthermore, by providing the disclosed automated functionality in web browsers, many different web sites can leverage the functionality without requiring integration into every web site or application. Further still, when a transaction is processed according to embodiments disclosed herein, costs may be reduced as the transaction is processed as a "card present transaction" which carries lower transaction fees and lower risk of fraud than "card not present transactions".

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts an exemplary computing architecture 100, also referred to as a system, consistent with disclosed embodiments. Although the computing architecture 100 shown in FIGS. 1A-1E has a limited number of elements in a certain topology, it may be appreciated that the computing architecture 100 may include more or less elements in alternate topologies as desired for a given implementation.

The computing architecture 100 comprises one or more computing devices 102, one or more authentication servers 106, one or more contactless cards 104, and one or more merchant servers 108. The contactless card 104 is representative of any type of card, such as a credit card, debit card, ATM card, gift card, payment card, smart card, and the like. The contactless card 104 may comprise one or more communications interfaces 124, such as a radio frequency identification (RFID) chip, configured to communicate with a communications interface 124 (also referred to herein as a "card reader", a "wireless card reader", and/or a "wireless communications interface") of the computing devices 102 via NFC, the EMV standard, or other short-range protocols in wireless communication. Although NFC is used as an example communications protocol herein, the disclosure is equally applicable to other types of wireless communications, such as the EMV standard, Bluetooth, and/or Wi-Fi.

The computing device 102 is representative of any number and type of computing device, such as smartphones, tablet computers, wearable devices, laptops, portable gaming devices, virtualized computing system, merchant terminals, point-of-sale systems, servers, desktop computers, and the like. A mobile device may be used as an example of the computing device 102, but should not be considered limiting of the disclosure. The authentication server 106 and merchant server 108 are representative of any type of computing device, such as a server, workstation, compute cluster, cloud computing platform, virtualized computing system, and the like. Although not depicted for the sake of clarity, the computing device 102, contactless card 104, authentication server 106, and merchant server 108 each include one or more processor circuits, e.g., to execute programs, code, and/or instructions.

As shown, a memory 110 of the contactless card 104 includes an applet 112, a counter 114, a master key 116, a diversified key 118, and a unique customer identifier (ID) 120. The applet 112 is executable code configured to perform the operations described herein. The counter 114, master key 116, diversified key 118, and customer ID 120 are used to provide security in the system 100 as described in greater detail below.

As shown, a memory 126 of the authentication server 106 includes an authentication application 128 and an account database 130. The account database 130 generally includes information related to an account holder (e.g., one or more users), one or more accounts of the account holder, and one or more contactless cards 104 of the account. For each contactless card associated with a financial institution associated with the authentication server 106, the authentication server 106 may store corresponding instances of the master key 116 and counter 114.

As shown, a memory 134 of the computing device 102 includes an instance of an operating system 136. Example operating systems include the Android® OS, iOS®, macOS®, Linux®, and Windows® operating systems. As shown, the operating system 136 includes an account application 138 and a web browser 140. The account application 138 allows users to perform various account-related operations, such as activating payment cards, viewing account balances, purchasing items, processing payments, and the like. In some embodiments, a user may authenticate using authentication credentials to access certain features of the account application 138. For example, the authentication credentials may include a username (or login) and password, biometric credentials (e.g., fingerprints, Face ID, etc.), and the like. The web browser 140 is an application that allows the computing device 102 to access information via the network 154 (e.g., via the Internet). For example, using the web browser 140, the user may access one or more resources of the merchant server 108, such as the web page 142 stored in the memory 152 of the merchant server 108, which may be one of a plurality of web pages hosted by the merchant server 108 (or another hosting entity). Although a web browser is used as a reference example herein, the techniques of the disclosure are equally applicable to other types of applications (e.g., dedicated shopping applications provided by the merchant, other types of applications, etc.).

More generally, when accessing web pages provided by merchant server 108, a user may select one or more products, services, or other items for purchase via the web browser 140. For example, the user may wish to purchase a basketball and a soccer ball, and may add these items to their shopping cart. To complete the purchase, the web page 142 may include a form with one or more payment fields. The payment fields may include fields for an account number, expiration date, CVV, customer name, customer billing address, customer email address, customer phone number, etc. However, certain restrictions may prevent data from being autofilled into these payment fields. For example, the OS and/or web browser 140 may restrict the account application 138 from providing data to be autofilled into the form. Furthermore, the user may not have an account with the merchant server 108. Advantageously, however, embodiments disclosed herein provide solutions to overcome these restrictions using an automated checkout process.

In some embodiments, the web page 142 may include a selectable element to begin the automated checkout process. In some embodiments, the merchant may provide the automated checkout process for one or more of a plurality of financial institutions. Therefore, if more than one financial institution is supported, the web page 142 may present the user with a list of the financial institutions when the selectable element is selected. The user may then select a financial institution from the list (e.g., a financial institution that issued the contactless card 104). Doing so may cause the web page 142 and/or web browser 140 to generate a uniform resource identifier (URI) 144. At least a portion of the URI 144 may be directed to the account application 138 based on the account application 138 being registered with the OS. Examples of the URI 144 and/or the portion thereof may include "example://automatedcheckout" or "www.example-.com/automatedcheckout". Furthermore, the URI 144 may include one or more parameters. The parameters may include a merchant ID parameter, a user ID parameter, a session ID parameter, and an action ID parameter. If only one financial institution is supported, the user need not select the institution as a condition to generation of the URI 144. The web page 142 and/or web browser 140 may then provide the URI 144 to the operating system 136 for processing. In some embodiments, the URI 144 is displayed and selected by the user prior to providing the URI 144 to the operating system 136.

The merchant ID parameter may be associated with the merchant providing the web page 142 and/or the merchant server 108. Therefore, the account application 138 may uniquely identify each of a plurality of merchants using a respective merchant ID parameter of a plurality of merchant ID parameters. Doing so allows the account application 138 to identify addresses of the merchant server 108 associated with the merchant ID and/or identify addresses of any web pages 142 associated with the merchant ID. The user ID parameter may be a unique identifier for a user associated with the browsing session. Because the user may not be logged in and/or may not have an account with the merchant server 108, the user ID may uniquely identify the user. The session ID parameter may identify the browsing session in the web browser 140 vis a vis the merchant server 108. For example, the session ID parameter may be used to identify shopping cart, pages previously visited, a current page displayed in the web browser 140 (e.g., the web page 142), and the like. The action ID may generally specify, to the account application 138, an action or operation to be performed. For example, in some embodiments, the action ID may instruct the account application 138 to open an authentication page and/or an automated checkout page for the automated checkout process. Therefore, the URI 144 may be a deep link to one or more pages of the account application 138. Examples of the URI 144 may include "example:// automatedcheckout?merchID=123&sessID= ABC&userID=XYZ&actID=456" or "www.example.com/?merchID=123&sessID= ABC&userID=XYZ&actID=456". In some embodiments, the URI 144 may be an Android Universal Link or an Apple® App Link.

In some embodiments, the operating system 136, web browser 140, and/or the web page 142 may determine whether the account application 138 is installed on the computing device 102. The operating system 136, web browser 140, and/or the web page 142 may use any feasible technique to determine whether the account application 138 is installed. For example, in iOS, the operating system 136, web browser 140, and/or the web page 142 may use the canOpenURL( ) method to determine whether a URI directed to the account application 138 may be opened. The method may generally return an indication of whether or not the URI can be opened. Doing so allows the operating system 136, web browser 140, and/or the web page 142 to determine that the account application 138 is installed on the computing device 102.

In some operating systems, such as the Android OS, the operating system 136, web browser 140, and/or the web page 142 may use a content provider service to determine whether the account application 138 is installed on the device. For example, the operating system 136, web browser 140, and/or the web page 142 may provide a URI directed to the account application 138 to the content provider service, which may return an indication of whether or not the URI can be opened. Doing so allows the operating system 136, web browser 140, and/or the web page 142 to determine that the account application 138 is installed on the computing device 102.

If the account application 138 is not installed on the device 102, the operating system 136 may download and install the account application 138 on the device 102. In some embodiments, the account application 138 may be an instant application, app clip, progressive web application, or any other non-persistent application. In other embodiments, a persistent version of the account application 138 is installed on the computing device 102 from an application store.

With the account application 138 available on the computing device 102, the OS may process the URI 144, which causes the OS to open, access, launch, or otherwise display the account application 138. Doing so further provides the URI 144 including the parameters to the account application 138. Based on the action ID parameter of the URI 144, the account application 138 may open an account authentication page to facilitate the autofill techniques described herein.

In some embodiments, the operating system 136, web browser 140, and/or the web page 142 may determine whether the account application 138 is installed on the computing device 102 prior to providing the selectable element to begin the automated checkout and/or generating the URI 144. In such embodiments, if the account application 138 is not installed on the computing device 102, the web page 142 and/or web browser 140 may refrain from providing the selectable element and/or the automated checkout process. Similarly, in some embodiments, if the account application 138 is not installed on the computing device 102, the web browser 140 and/or web page 142 may refrain from generating the URI 144.

As stated, in some embodiments, the account application 138 may not be installed on the computing device 102. Therefore, in some embodiments, the web page 142 may encode a graphical representation of the URI 144 (including the merchant ID parameter, user ID parameter, and session ID parameter), which may be displayed in the web page 142. The graphical representation may generally be used to initiate the autofill techniques described herein without requiring the user to select the URI 144 and/or select a financial institution from the list. The graphical representation may include a matrix code (also referred to as a matrixed code, matrix barcode, etc.). Examples of matrix codes include, but are not limited to, a quick response (QR) code, app clip code, and the like. Therefore, in such embodiments, a camera (not pictured) or other optical reader of the computing device 102 may detect the matrix code that encodes the URI 144, e.g., in one or more images. Once the matrix code is detected, the operating system 136, web browser 140, and/or the web page 142 may decode the URI 144 and determine whether the account application 138 is installed on the computing device 102 based on the URI 144 as described herein. If the account application 138 is not installed on the computing device 102, the OS 136 may download the account application 138 and install the account application 138 on the computing device 102. In some embodiments, the account application 138 is downloaded based on approval input received from a user. As stated, the downloaded application may include a persistent or non-persistent (e.g., instant application, app clip, progressive web application, etc.) version of the account application 138. The downloaded account application 138 may then be accessed, launched, or otherwise displayed. As stated, the parameters of the URI 144 may be provided to the account application 138, which opens the account authentication page to facilitate the autofill techniques described herein. Embodiments are not limited in these contexts.

Figure 1B:
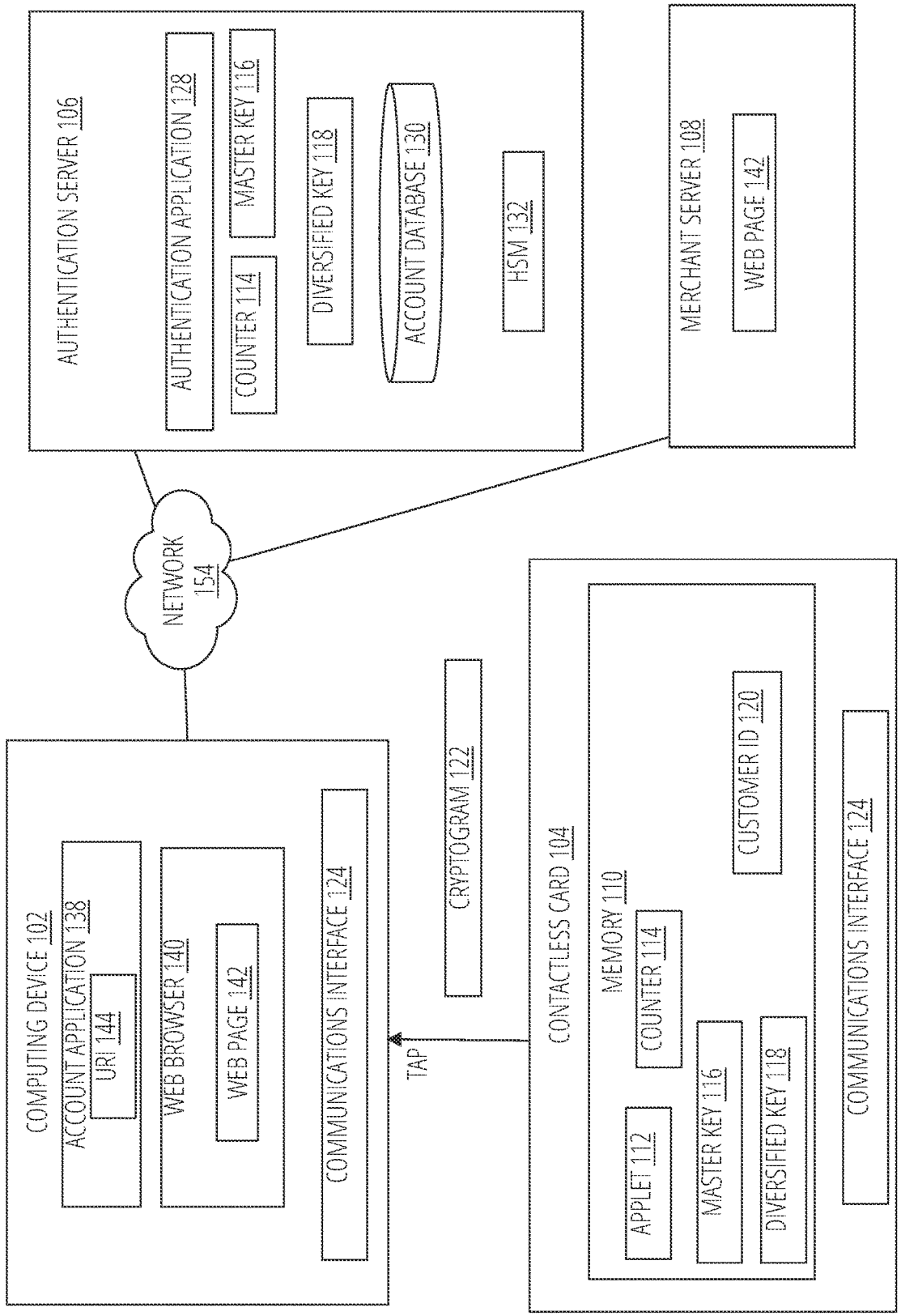
FIG. 1B illustrates an aspect of the subject matter in accordance with one embodiment.

FIG. 1B depicts an embodiment where the OS has accessed the URI 144 and the account application 138 has loaded the account authentication page. As stated, the URI 144 may be accessed based on selection of the URI 144 and/or based on a camera detecting a graphical representation of the URI 144 (e.g., a matrix code). Generally, the account authentication page allows users to authenticate their account, e.g., via a login and password, biometrics, etc. The account application 138 and/or the authentication server 106 may authenticate any received authentication credentials.

Once authenticated, the account application 138 may associate the user ID parameter and the session ID parameter of the URI 144 with the authenticated account (and/or transmit the user ID parameter and session ID parameter to the authentication server 106 for association with the account). The account application 138 may then instruct the user to tap the contactless card 104 to the computing device 102 (or otherwise bring the contactless card 104 within communications range of the communications interface 124 of the device 102). Doing so may cause the applet 112 of the contactless card 104 to generate a cryptogram 122.

The cryptogram 122 may be based on the customer ID 120 of the contactless card 104. The cryptogram 122 may be generated based on any suitable cryptographic technique. In some embodiments, the applet 112 may include an unencrypted identifier (e.g., the customer ID 120, an identifier of the contactless card 104, and/or any other unique identifier) as part of a data package including the cryptogram 122. In at least one embodiment, the data package is an NDEF file.

As stated, the computing architecture 100 is configured to implement key diversification to secure data, which may be referred to as a key diversification technique herein. Generally, the authentication server 106 (or another computing device) and the contactless card 104 may be provisioned with the same master key 116 (also referred to as a master symmetric key). More specifically, each contactless card 104 is programmed with a distinct master key 116 that has a corresponding pair in the authentication server 106. For example, when a contactless card 104 is manufactured, a unique master key 116 may be programmed into the memory 110 of the contactless card 104. Similarly, the unique master key 116 may be stored in a record of a customer associated with the contactless card 104 in the account database 130 of the authentication server 106 (and/or stored in a different secure location, such as the hardware security module (HSM) 132). The master key 116 may be kept secret from all parties other than the contactless card 104 and authentication server 106, thereby enhancing security of the system 100. In some embodiments, the applet 112 of the contactless card 104 may encrypt and/or decrypt data (e.g., the customer ID 120) using the master key 116 and the data as input a cryptographic algorithm. For example, encrypting the customer ID 120 with the master key 116 may result in the cryptogram 122. Similarly, the authentication server 106 may encrypt and/or decrypt data associated with the contactless card 104 using the corresponding master key 116.

In some embodiments, the master keys 116 of the contactless card 104 and authentication server 106 may be used in conjunction with the counters 114 to enhance security using key diversification. The counters 114 comprise values that are synchronized between the contactless card 104 and authentication server 106. For example, the counters 114 may comprise a number that changes each time data is exchanged between the contactless card 104 and the authentication server 106 (and/or the contactless card 104 and the computing device 102). Generally, the applet 112 may provide the master key 116, unique customer ID 120, and a diversification factor as input to a cryptographic algorithm, thereby producing a diversified key 118. In some embodiments, the diversification factor is the counter 114. The diversified key 118 may then be used to encrypt some data, such as the diversification factor (e.g., the counter 114) or other sensitive data. The applet 112 and the authentication server 106 may be configured to encrypt the same type of data to facilitate the decryption and/or verification processing of the cryptogram 122.

More generally, when preparing to send data (e.g., to the authentication server 106 and/or the computing device 102), the applet 112 of the contactless card 104 may increment the counter 114. The applet 112 of the contactless card 104 may then provide the master keys 116, customer ID 120, and counter 114 as input to a cryptographic algorithm, which produces a diversified key 118 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

The applet 112 may then encrypt some data (e.g., the unique customer ID 120, the counter 114, a command, and/or any other data) using the diversified key 118 and the data as input to the cryptographic algorithm. For example, encrypting the unique customer ID 120 the diversified key 118 may result in an encrypted unique customer ID 120 (e.g., a cryptogram 122).

In some embodiments, two diversified keys 118 may be generated, e.g., based on one or more portions of the input to the cryptographic function. In some embodiments, the two diversified keys 118 are generated based on two distinct master keys 116, the unique customer ID 120, and the counter 114. In such embodiments, a message authentication code (MAC) is generated using one of the diversified keys 118, and the MAC may be encrypted using the other one of the diversified keys 118. The MAC may be generated based on any suitable data input to a MAC algorithm, such as sensitive data, the unique customer ID 120, the counter 114, etc. More generally, the applet 112 and the authentication server 106 may be configured to generate the MAC based on the same data. In some embodiments, the cryptogram 122 is included in a data package such as an NDEF file. The account application 138 may then read the data package including cryptogram 122 via the communications interface 124 of the computing device 102.

Figure 1C:
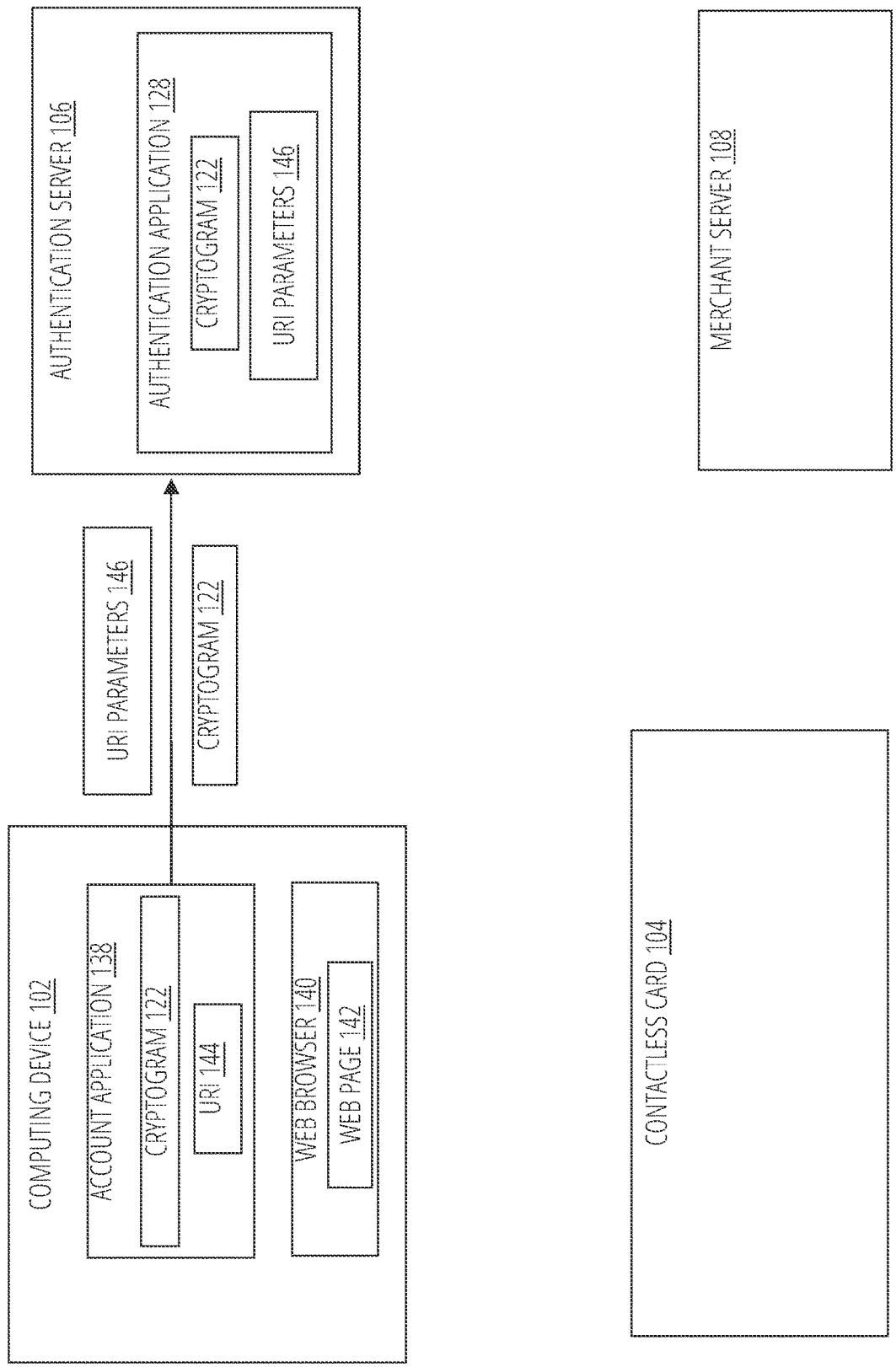
FIG. 1C illustrates an aspect of the subject matter in accordance with one embodiment.

FIG. 1C depicts an embodiment where the account application 138 transmits the data package including the cryptogram 122 to the authentication server 106. As shown, the account application 138 may further transmit the URI parameters 146 to the authentication server 106. The URI parameters 146 may include the merchant ID parameter, user ID parameter, and session ID parameter. The authentication server 106 may then associate the user ID and session IDs with the account in the account database 130 (if not done so already).

The authentication server 106 may provide the cryptogram 122 to the authentication application 128 and/or the HSM 132 for verification based at least in part on the instance of the master key 116 stored by the authentication server 106. In some embodiments, the authentication application 128 and/or the HSM 132 may identify the master key 116 and counter 114 using the unencrypted customer ID 120 provided to the server 106 with the cryptogram 122. In some examples, the authentication application 128 may provide the master key 116, unique customer ID 120, and counter 114 as input to the cryptographic algorithm, which produces one or more diversified keys 118 as output. The resulting diversified keys 118 may correspond to the diversified keys 118 of the contactless card 104, which may be used to decrypt the cryptogram 122 and/or verify the MAC once decrypted. For example, the authentication server 106 may generate a MAC based on the same data as the applet 112, e.g., the sensitive data, the unique customer ID 120, and/or the counter 114. If the MAC generated by the authentication server 106 matches the decrypted MAC in the cryptogram 122, the authentication server 106 may verify or otherwise authenticate the cryptogram 122.

Regardless of the verification technique used, the authentication application 128 and/or the HSM 132 may successfully decrypt the cryptogram 122 and verify the MAC, thereby verifying or authenticating the cryptogram 122.

If the decryption is successful, the authentication application 128 may transmit a decryption result to the account application 138 indicating that the server decrypted and/or verified the cryptogram 122. Furthermore, the authentication server 106 may generate a VCN, expiration date, and CVV for the transaction. The VCN is generally a one-time use account number associated with the account, but the VCN is different than the account number of the contactless card 104. The authentication server 106 may restrict use of the VCN to the merchant (e.g., based on the merchant ID). Doing so ensures that the VCN can only be used to process a payment with the merchant. For example, if a different merchant requests to process a transaction using the VCN, or a user requests to process a transaction with a different merchant using the VCN, the server may reject these transactions. The authentication server 106 may further place time restrictions, amount restrictions, location restrictions, etc., on the VCN. The authentication server 106 may reject any transactions that do not comply with these restrictions. The authentication server 106 may then transmit the VCN, expiration date, and CVV to the merchant server 108. The authentication server 106 may further transmit, to the merchant server 108, the session ID, user ID, and contact information (e.g., user name, billing address, shipping address, email address, phone number, etc.) to the merchant server 108.

However, if the authentication application 128 is unable to decrypt the cryptogram 122 to yield the expected result (e.g., the customer ID 120 of the account associated with the contactless card 104), the authentication application 128 does not validate the cryptogram 122. In such an example, the authentication application 128 determines to terminate the automated checkout process. The authentication application 128 may transmit an indication of the failed decryption to the computing device 102.

Figure 1D:
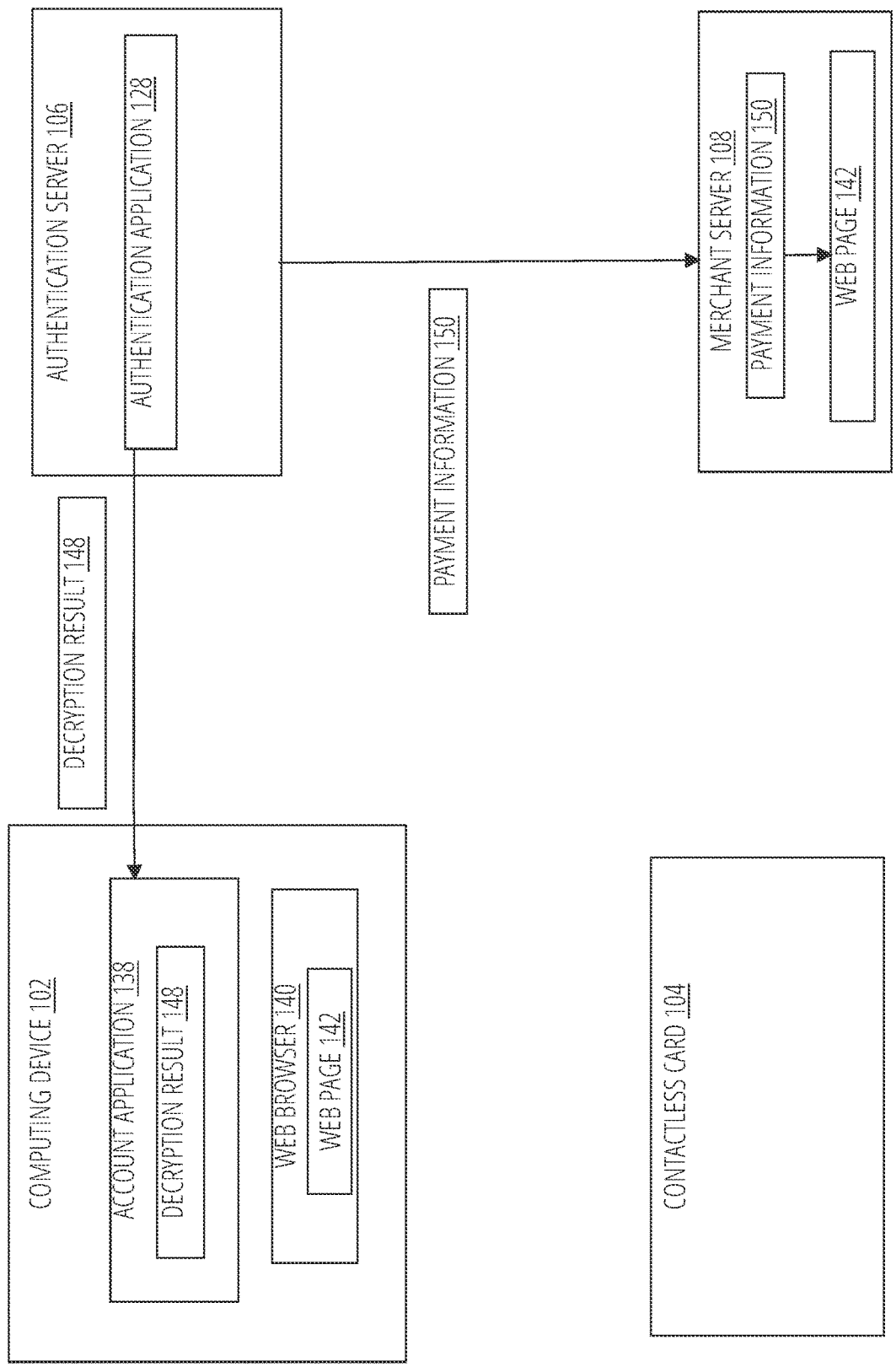
FIG. 1D illustrates an aspect of the subject matter in accordance with one embodiment.

FIG. 1D depicts an embodiment where the authentication application 128 transmits a decryption result 148 to the account application 138 and payment information 150 to the merchant server 108. The decryption result 148 generally reflects whether or not the cryptogram 122 was decrypted. In the example depicted in FIG. 1D, the decryption result 148 may indicate the authentication server 106 decrypted or otherwise verified the cryptogram 122. Doing so may allow the account application 138 to determine that the cryptogram 122 was successfully decrypted and/or verified prior to continuing the autofill process, thereby improving security.

The payment information 150 may generally include the VCN, the expiration date of the VCN, the CVV of the VCN, the session ID, user ID, and the user's contact information (e.g., user name, billing address, shipping address, email address, phone number, etc.). In some embodiments, the URI 144 includes, as a parameter, an indication of an address of the merchant server 108. Doing so allows the authentication server 106 to transmit the payment information 150 to the merchant server 108 based on the address. In other embodiments, the authentication server 106 may store a list of addresses for a plurality of different merchants, each entry indexed by a respective merchant ID. In such examples, the authentication server 106 may identify the address for the merchant server based on the merchant ID in the URI 144.

Once received, the merchant server 108 may identify the user's browsing session based on the user ID and/or the session ID. Doing so allows the merchant server 108 to inject, populate, or otherwise fill the received payment information 150 into one or more form fields of the web page 142 corresponding to the session ID and/or user ID. For example, the merchant server 108 may populate the VCN into a card number form field, the expiration date into an expiration date form field, the CVV into a CVV form field, and so on. More generally, the merchant server 108 may store the payment information 150 for later use.

Responsive to receiving the decryption result 148, the account application 138 may cause the computing device 102 to switch back to the web browser 140. For example, the account application 138 may instruct the operating system 136 to launch the web browser 140. As another example, the account application 138 may output a selectable element directed to the web browser 140 which, when selected, causes the operating system 136 to launch the web browser 140.

In some embodiments, the user may not return to the web browser 140 and/or may not complete the purchase using the VCN within a threshold amount of time. The amount of time may be measured based on a time the VCN was generated. In such embodiments, the authentication server 106 and/or merchant server 108 may transmit a notification to the computing device 102, which may remind the user to complete the purchase using the VCN. The notification may include a push notification, email, text message, etc. Therefore, the authentication server 106 and the merchant server 108 may communicate to exchange timing information (e.g., to determine if the time threshold is exceeded), indicate whether the purchase was completed, and cause the transmission of notifications to the computing device 102.

Figure 1E:
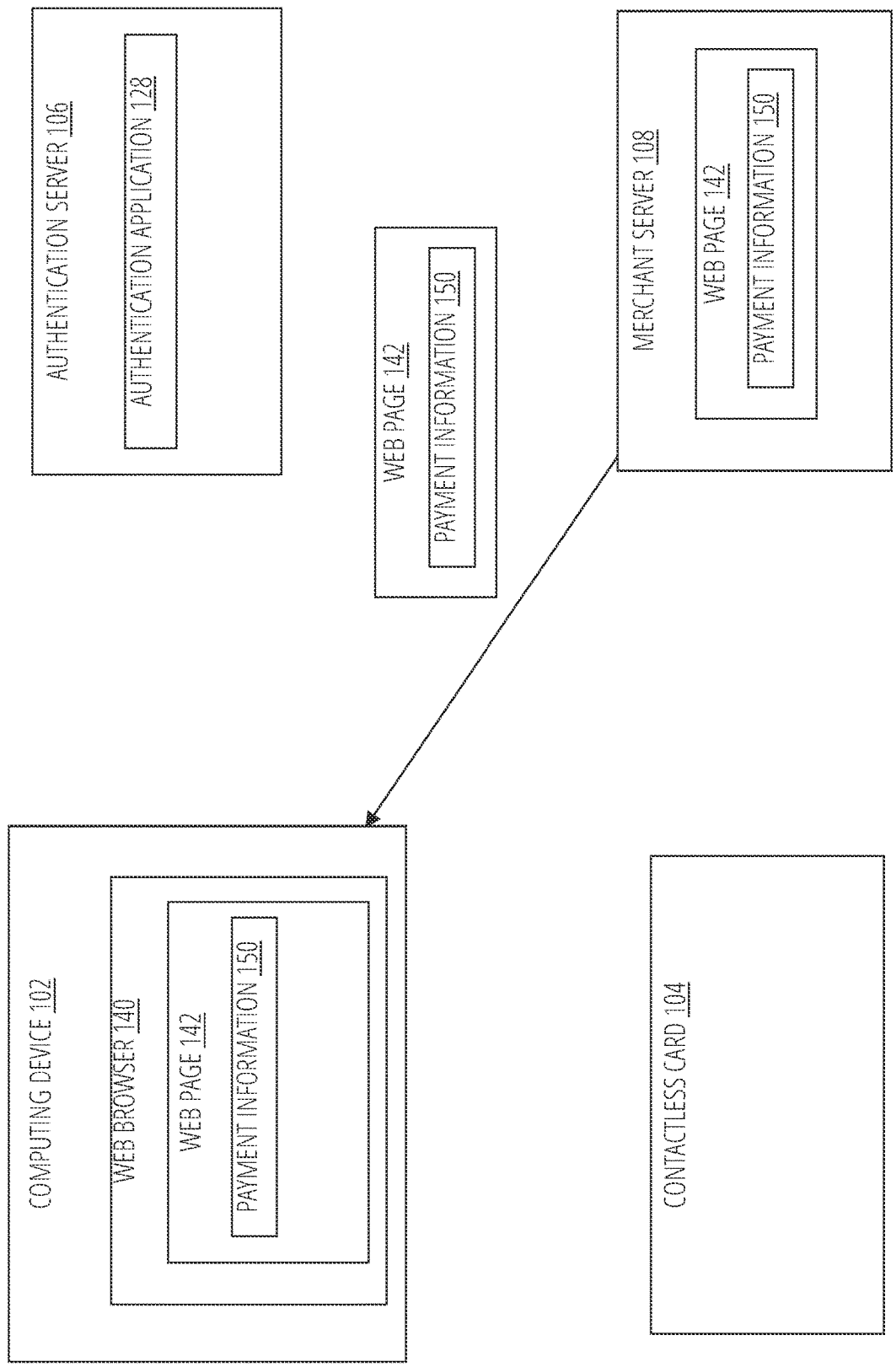
FIG. 1E illustrates an aspect of the subject matter in accordance with one embodiment.

FIG. 1E depicts an embodiment where the web page 142 is refreshed to include the payment information 150 in the form fields of the web page 142. The web page 142 may be refreshed according to any technique. For example, a user may refresh the web page 142 in the web browser 140, which causes the merchant server 108 to transmit the web page 142 including the payment information 150 filled into the form fields. As another example, the merchant server 108 may automatically cause the web page 142 to be reloaded in the web page 142, e.g., a server-initiated refresh. As yet another example, the merchant server 108 may transmit executable instructions (e.g., JavaScript, etc.) to cause the web browser 140 to update the web page 142 to include the payment information 150 in the form fields.

Regardless of the technique used to refresh the web page 142, once refreshed, the web page 142 includes the payment information 150 automatically entered into the form fields. For example, an account number field may include the VCN, an expiration date field may include the expiration date, a CVV field may include the CVV, one or more name fields may include the account holder's name, a billing address field may include the account billing address, an email field may include an account email address, a phone number field may include an account phone number, and so on.

Furthermore, the refreshed web page 142 further maintains the browsing session from the web browser 140. For example, the web page 142 including a payment form may be rendered in the web browser 140 allowing the user to purchase one or more items the user previously added to their shopping cart in the web browser 140. Continuing with the above example, the web browser 140 may load the web page 142 which reflects the user's shopping cart, which includes a basketball and a soccer ball.

Advantageously, the payment information 150 is automatically populated into the one or more payment fields of the web page 142 when refreshed. The user may optionally modify the information entered into the form fields. The user may then submit the form including the payment information 150 to complete the purchase.

Figure 1F:
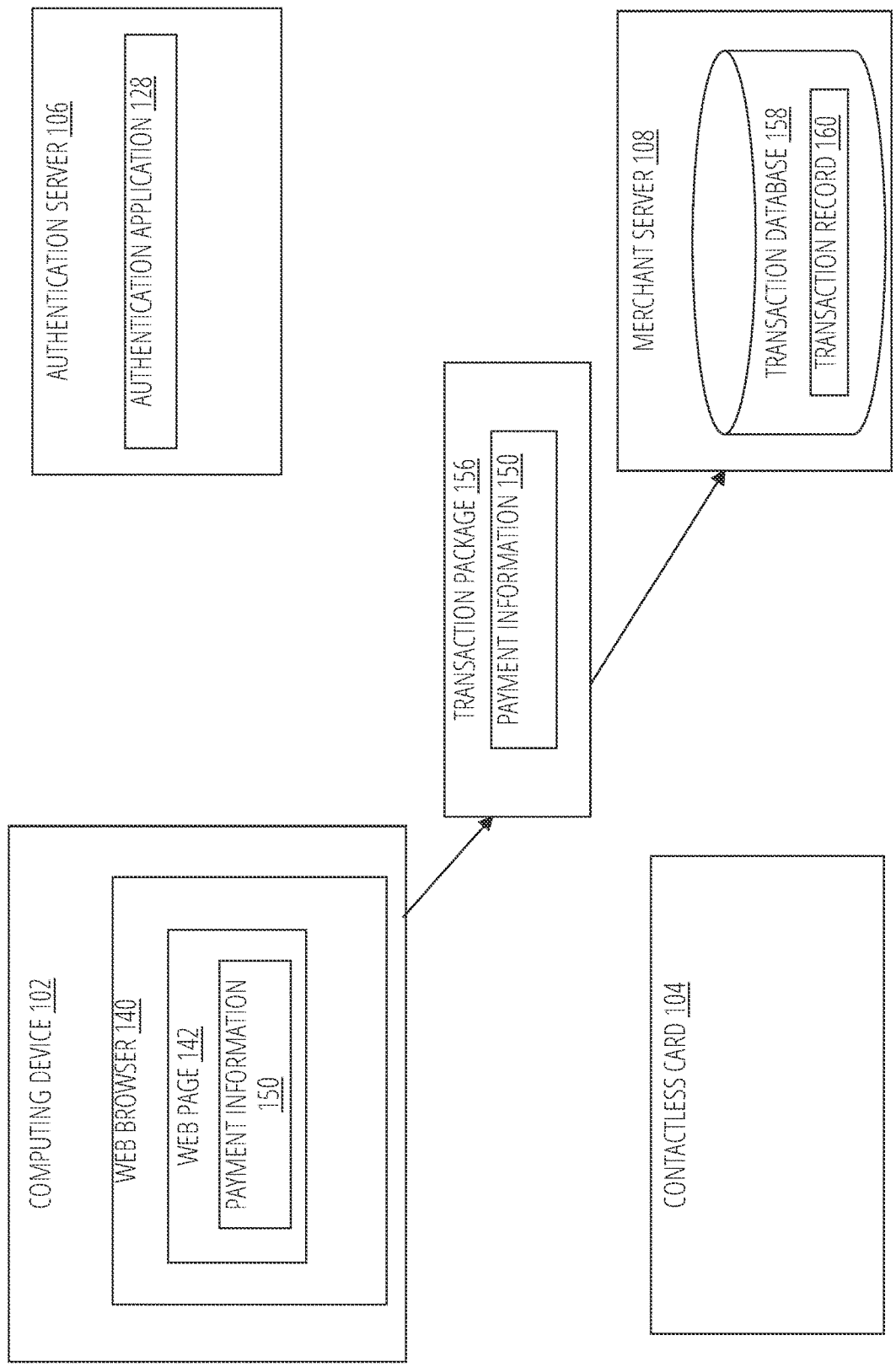
FIG. 1F illustrates an aspect of the subject matter in accordance with one embodiment.

FIG. 1F depicts an embodiment where the web browser 140 and/or web page 142 generates a transaction package 156 to process a payment using the payment information 150 filled into the form fields of the web page 142. Generally, the transaction package 156 may be transmitted according to the hypertext transfer protocol (HTTP). Once received, the merchant server 108 may process payment for the transaction using the payment information 150. The authentication server 106 may approve the transaction based at least in part on the VCN being used as payment for the transaction with the merchant, as the VCN is bound or restricted to the merchant. The merchant server 108 may then create a transaction record 160 for the transaction in a transaction database 158. A confirmation for the transaction may then be displayed in the web browser 140.

Because the transaction is processed using the VCN generated by the authentication server 106, the transaction may be processed as a "card present transaction", even though the transaction was conducted online. Advantageously, doing so reduces fees for processing the transaction and further reduces risk of fraud. Therefore, in some embodiments, the merchant may provide a discount for purchases (e.g., a percentage discount, a dollar discount, etc.) completed using the automated mobile web authentication and checkout process disclosed herein. Embodiments are not limited in these contexts.

In some embodiments, the merchant server 108 may allow the user to create an account subsequent to completion of the purchase (and/or contemporaneously with the purchase). In such embodiments, the merchant server 108 may create the account based at least in part on the account holder name and contact information (e.g., address, phone number, email address, etc.) received from the authentication server 106. In some embodiments, the merchant server 108 may further create the account using the user ID parameter of the URI 144 to identify the user. The user may further provide any other additional information (e.g., login/password, biometrics, other attributes, etc.) to create the account.

In some embodiments, by storing the payment information 150, the merchant server 108 need not process the transaction using the payment information 150 in the transaction package 156. Instead, in such embodiments, the merchant server 108 processes the transaction based on the stored payment information 150, with the transaction package 156 serving as the user's consent to process the purchase using the stored payment information 150. If, however, the user edits any of the payment information 150 presented in the web page 142, the merchant server 108 may process the transaction using the payment information 150 edited by the user.

Figure 2B:
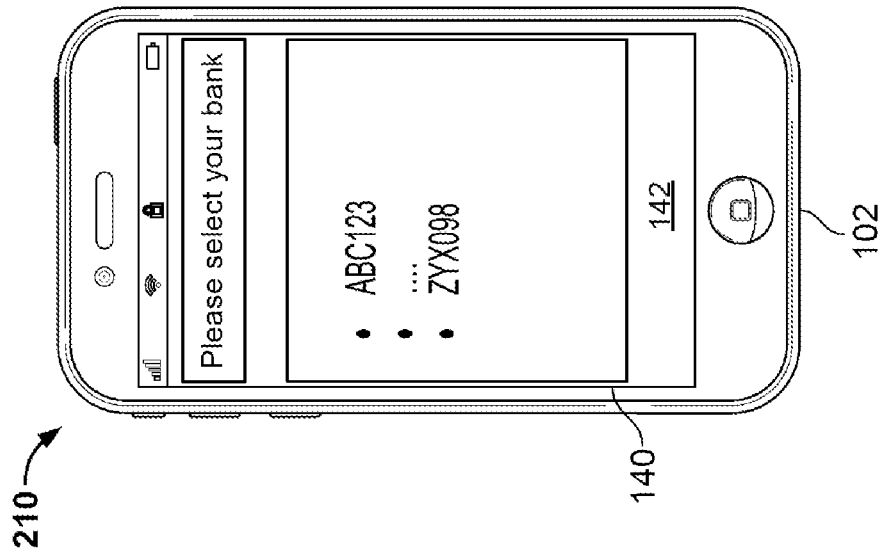
FIG. 2B illustrates an aspect of the subject matter in accordance with one embodiment.
Figure 2A:
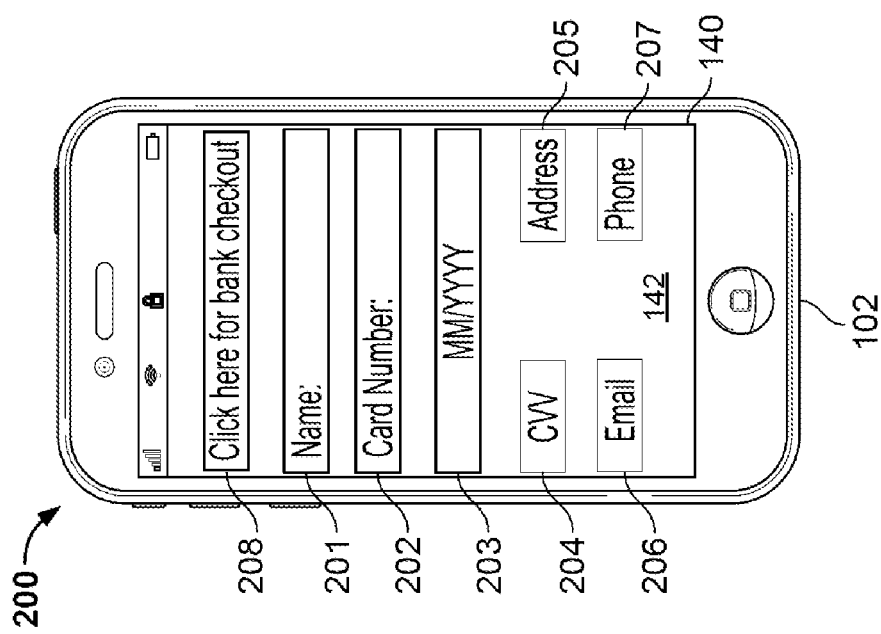
FIG. 2A illustrates an aspect of the subject matter in accordance with one embodiment.

FIG. 2A is a schematic 210 depicting an example embodiment of automated mobile web browser authentication and checkout using a contactless card. As shown, FIG. 3A includes depicts mobile computing device 102 executing a web browser 140. The web browser 140 may display a web page, such as the web page 142. For example, the web page 142 may be a web page 142 that allows a user to place an order and provide payment information for the order via one or more form fields. As shown, the web page 142 includes the payment form having fields 201-207, where field 201 is a name field, field 202 is an account number field, field 203 is an expiration date field, field 204 is a CVV field, field 205 is an address field, field 206 is an email address field, and field 207 is a phone number field.

The web page 142 further includes a selectable element 208 that allows the user to initiate the automated checkout process for server-side filling of payment information into the form fields 201-207. Embodiments are not limited in this context.

FIG. 2B is a schematic 210 illustrating an embodiment where the user has selected the element 208 to initiate the automated checkout process. As shown, the web page 142 prompts the user to select a financial institution from a list of financial institutions which support automated checkout. The user may then select one of the financial institutions from the list. Doing so may cause the web browser 140 to generate a URI (e.g., the URI 144) directed to the account application 138, which causes the computing device 102 to open or otherwise display the account application 138. The parameters of the URI may include the merchant ID, user ID, session ID, and action ID.

FIG. 2C is a schematic 220 depicting an embodiment where the URI is accessed and the account application 138 is loaded on the computing device 102. Based on the parameters of the URI (e.g., the action ID), the account application 138 outputs an authentication page that requests the user authenticate their account using a login/password for the automated checkout process. For example, the user may enter a username in field 221, a password in field 222, and select the submit button 223 to submit the username and password for verification. The account application 138 may then authenticate the credentials (and/or transmit the credentials to the authentication server 106 for authentication).

FIG. 2D is a schematic 230 reflecting an embodiment where the user successfully logs into their account. Once authenticated, the account application 138 and/or the authentication server 106 may associate the user ID and session ID with the authenticated account (e.g., by storing an indication of the association in the account database 130). In some embodiments, the account application 138 includes an instance of the account database 130. The account application 138 may then instruct the user to tap the contactless card 104 to the computing device 102.

The user may then tap the contactless card 104 to the computing device 102. Doing so causes the contactless card 104 to generate a cryptogram that is verified by the authentication server 106. As shown, the authentication server 106 verifies the cryptogram. Doing so may cause the authentication server 106 to generate and transmit payment information (e.g., VCN, expiration date, CVV, name, address, contact information, session ID, user ID, etc.) to the merchant server 108. Doing so allows the merchant server 108 to associate the payment information with the user ID and/or session ID. Furthermore, the merchant server 108 can perform server-initiated filling of the payment information into the form fields of the web page 142.

The authentication server 106 may further transmit an indication to the account application 138 specifying the server verified the cryptogram, that the VCN was generated, and the VCN along with other information was sent to the merchant server 108. The account application 138 may then cause the operating system 136 to switch back to the web browser 140 or otherwise bring the web browser 140 to the foreground of the computing device 102. For example, the account application 138 may determine, based on the merchant ID parameter and/or the action ID parameter, a URI for the web browser 140. Doing so may allow the account application 138 to switch the computing device 102 back to the web browser 140 to complete the automated checkout.

Figures 2E, 2F:
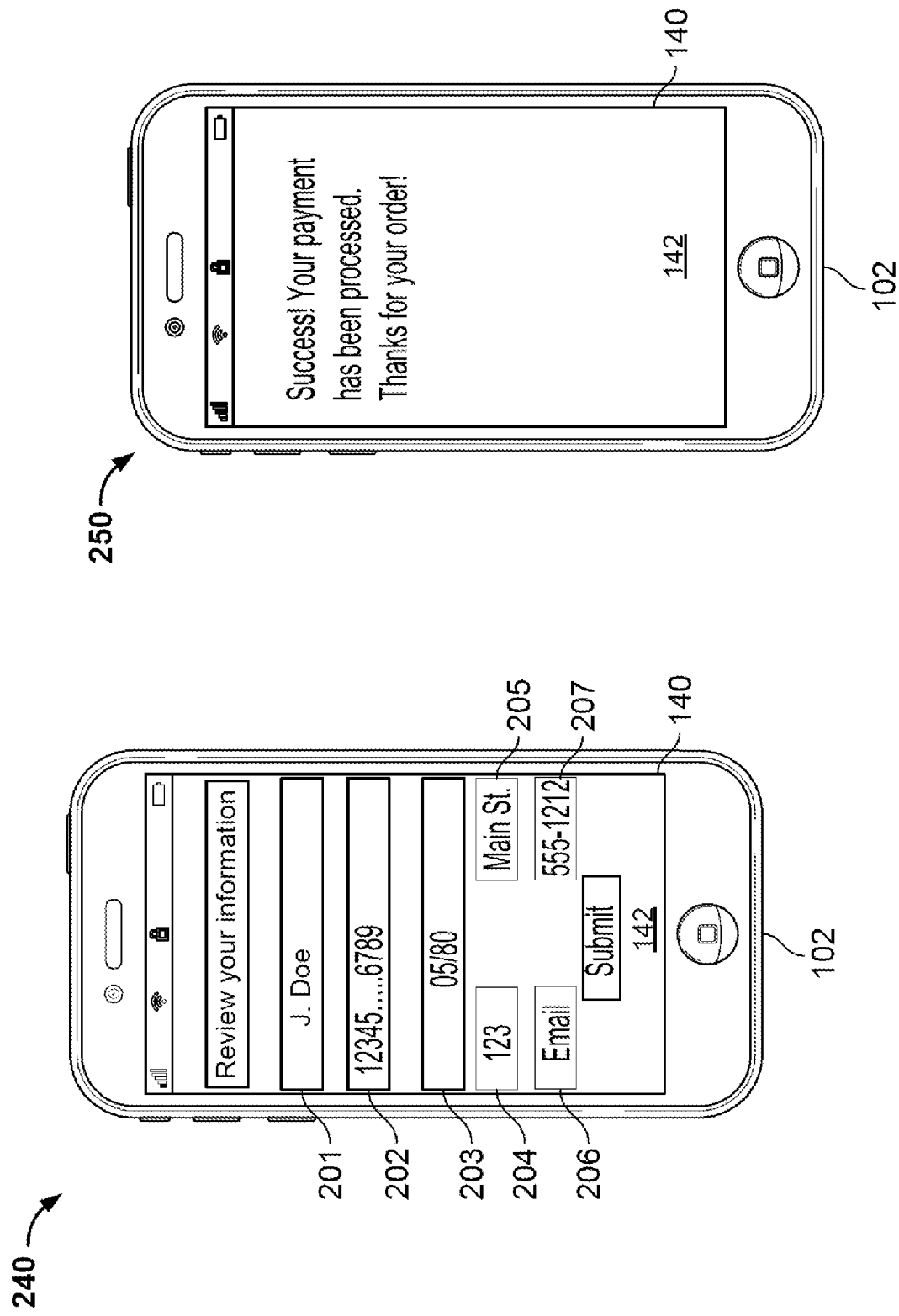
FIG. 2E illustrates an aspect of the subject matter in accordance with one embodiment.
FIG. 2F illustrates an aspect of the subject matter in accordance with one embodiment.

FIG. 2E is a schematic 240 illustrating the web page 142 including data filled into the form fields 201-207 by the merchant server 108. As shown, the user's name has been populated into the name field 201, the VCN has been populated in the account number field 202, the expiration date has been populated into the expiration date field 203, the CVV has been populated into the CVV field 204, the address has been populated into the address field 205, the email address has been populated into the email address field 206, and the phone number has been populated into the phone number field 207.

The user may then complete the purchase using the submit button, which causes the merchant server 108 to process the payment using the VCN and associated data. In some embodiments, the user may edit the information populated into the form fields 201-207. The embodiments are not limited in this context.

FIG. 2F is a schematic 250 illustrating a confirmation web page 142 in the web browser 140. The confirmation page generally reflects that the purchase was completed using the VCN and associated data automatically entered into the form fields 201-207.

Because the transaction is processed using the VCN generated by the authentication server 106, the transaction may be processed as a "card present transaction", even though the transaction was conducted online. Advantageously, doing so reduces fees for processing the transaction and further reduces risk of fraud. The embodiments are not limited in this context.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 3:
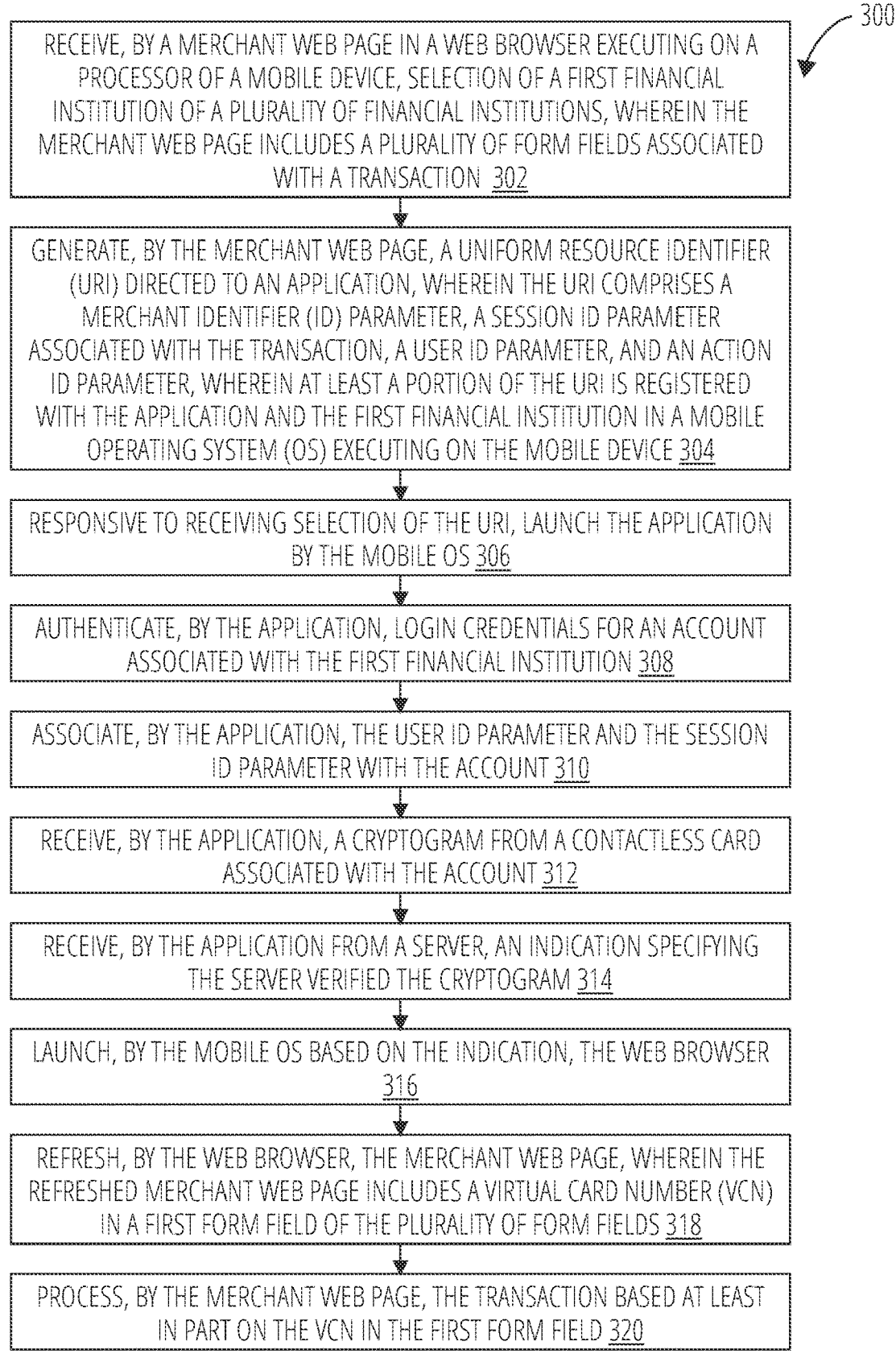
FIG. 3 illustrates a routine 300 in accordance with one embodiment.

FIG. 3 illustrates an embodiment of a logic flow, or routine, 300. The logic flow 300 may be representative of some or all of the operations executed by one or more embodiments described herein. For example, the logic flow 300 may include some or all of the operations for secure authentication and checkout in a mobile web browser 140 using a contactless card 104. Embodiments are not limited in this context.

In block 302, routine 300 receives, by a merchant web page 142 in a web browser 140 executing on a processor of a mobile computing device 102, selection of a first financial institution of a plurality of financial institutions, wherein the merchant web page 142 includes a plurality of form fields associated with a transaction. In block 304, routine 300 generates, by the merchant web page 142, a URI 144 directed to an application, such as the account application 138. The URI 144 may comprise a merchant identifier (ID) parameter, a session ID parameter associated with the transaction, a user ID parameter, and an action ID parameter, wherein at least a portion of the URI is registered with the account application 138 and the first financial institution in a mobile operating system 136 executing on the mobile device.

In block 306, routine 300 responsive to receiving selection of the URI 144, launches the account application 138 by the mobile operating system 136. In block 308, routine 300 authenticates, by the account application 138, login credentials for an account associated with the first financial institution. In block 310, routine 300 associates, by the account application 138, the user ID parameter and the session ID parameter with the account. In block 312, routine 300 receives, by the account application 138, a cryptogram (e.g., cryptogram 122) from a contactless card 104 associated with the account. In block 314, routine 300 receives, by the account application 138 from an authentication server 106, an indication specifying the authentication server 106 verified the cryptogram 122. In block 316, routine 300 launches, by the mobile operating system 136 based on the indication, the web browser 140. In block 318, routine 300 refreshes, by the web browser 140, the merchant web page 142. The refreshed merchant web page 142 includes a virtual card number (VCN) in a first form field of the plurality of form fields. The remaining form fields may include other attributes, such as the expiration date, CVV, and customer contact information (e.g., account holder name, address, phone number, email address, etc.). In block 320, routine 300 processes, by the merchant web page 142, the transaction based at least in part on the VCN in the first form field.

Figure 4:
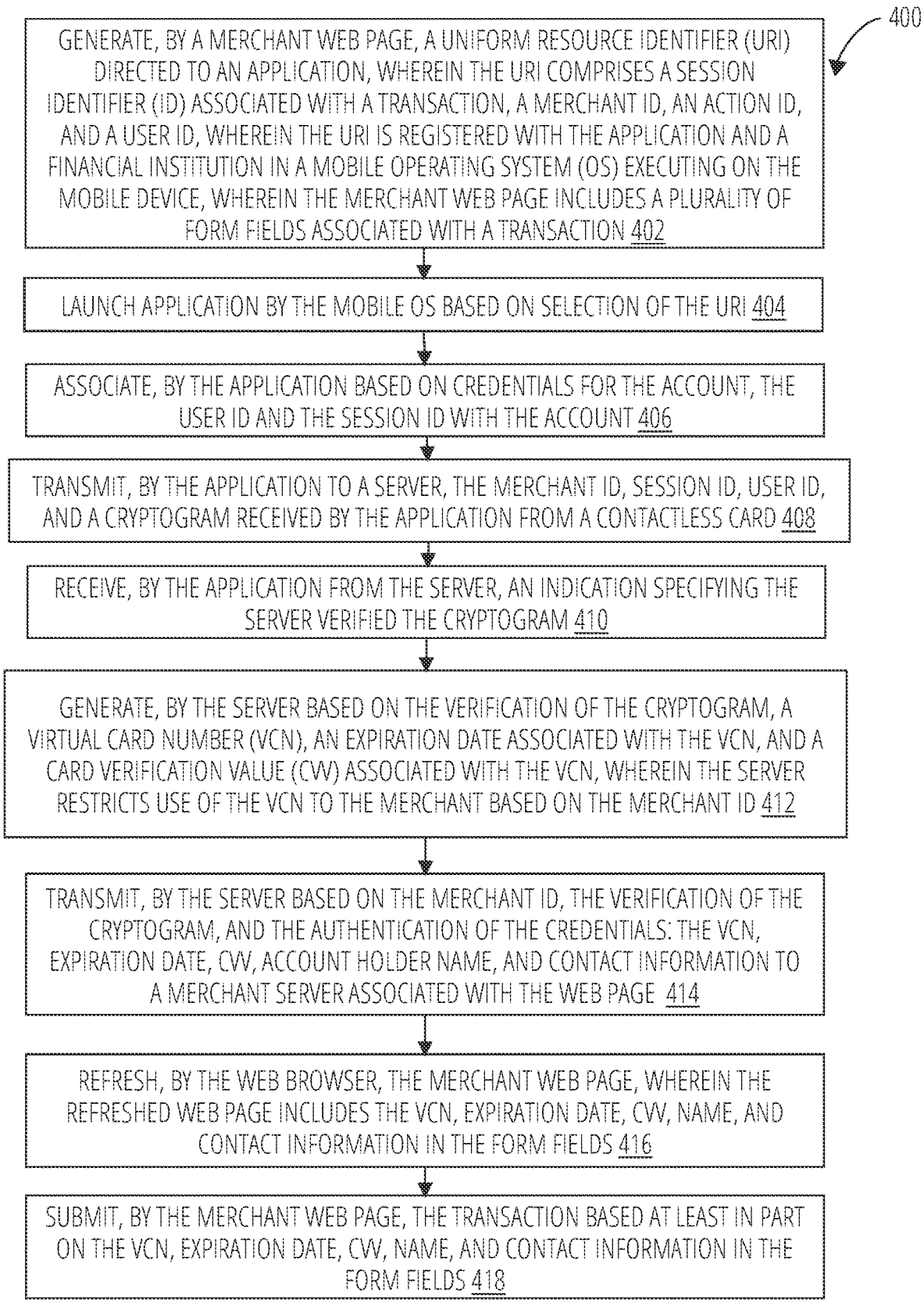
FIG. 4 illustrates a routine 400 in accordance with one embodiment.

FIG. 4 illustrates an embodiment of a logic flow, or routine, 400. The logic flow 400 may be representative of some or all of the operations executed by one or more embodiments described herein. For example, the logic flow 400 may include some or all of the operations for secure authentication and checkout in a mobile web browser 140 using a contactless card 104. Embodiments are not limited in this context.

In block 402, routine 400 generates, by a merchant web page 142, a URI 144 directed to an account application 138, wherein the URI 144 comprises a session identifier (ID) associated with a transaction, a merchant ID, an action ID, and a user ID, wherein at least a portion of the URI 144 is registered with the application and a financial institution in a mobile operating system 136 executing on the mobile computing device 102, wherein the merchant web page 142 includes a plurality of form fields associated with a transaction. In block 404, routine 400 launches the account application 138 by the mobile operating system 136 based on selection of the URI 144. In block 406, routine 400 associates, by the account application 138 based on credentials for the account, the user ID and the session ID with the account.

In block 408, routine 400 transmits, by the account application 138 to an authentication server 106, the merchant ID, session ID, user ID, and a cryptogram 122 received by the account application 138 from a contactless card 104. In block 410, routine 400 receives, by the account application 138 from the authentication server 106, an indication specifying the authentication server 106 verified the cryptogram 122. In block 412, routine 400 generates, by the authentication server 106 based on the verification of the cryptogram 122, a virtual card number (VCN), an expiration date associated with the VCN, and a card verification value (CVV) associated with the VCN, wherein the authentication server 106 restricts use of the VCN to the merchant and/or the merchant server 108 based on the merchant ID. In block 414, routine 400 transmits, by the authentication server 106 based on the merchant ID, the verification of the cryptogram, and the authentication of the credentials: the VCN, expiration date, CVV, account holder name, and contact information (e.g., mailing address, phone number, email address, etc.) to the merchant server 108 associated with the web page. In block 416, routine 400 refreshes, by the web browser 140, the merchant web page 142, wherein the refreshed merchant web page 142 includes the VCN, the expiration date, the CVV, account holder name, and contact information in respective ones of the plurality of form fields. In block 418, routine 400 submits, by the merchant web page 142, the transaction based at least in part on the VCN, the expiration date, the CVV, account holder name, and contact information in the form fields.

Figure 5:
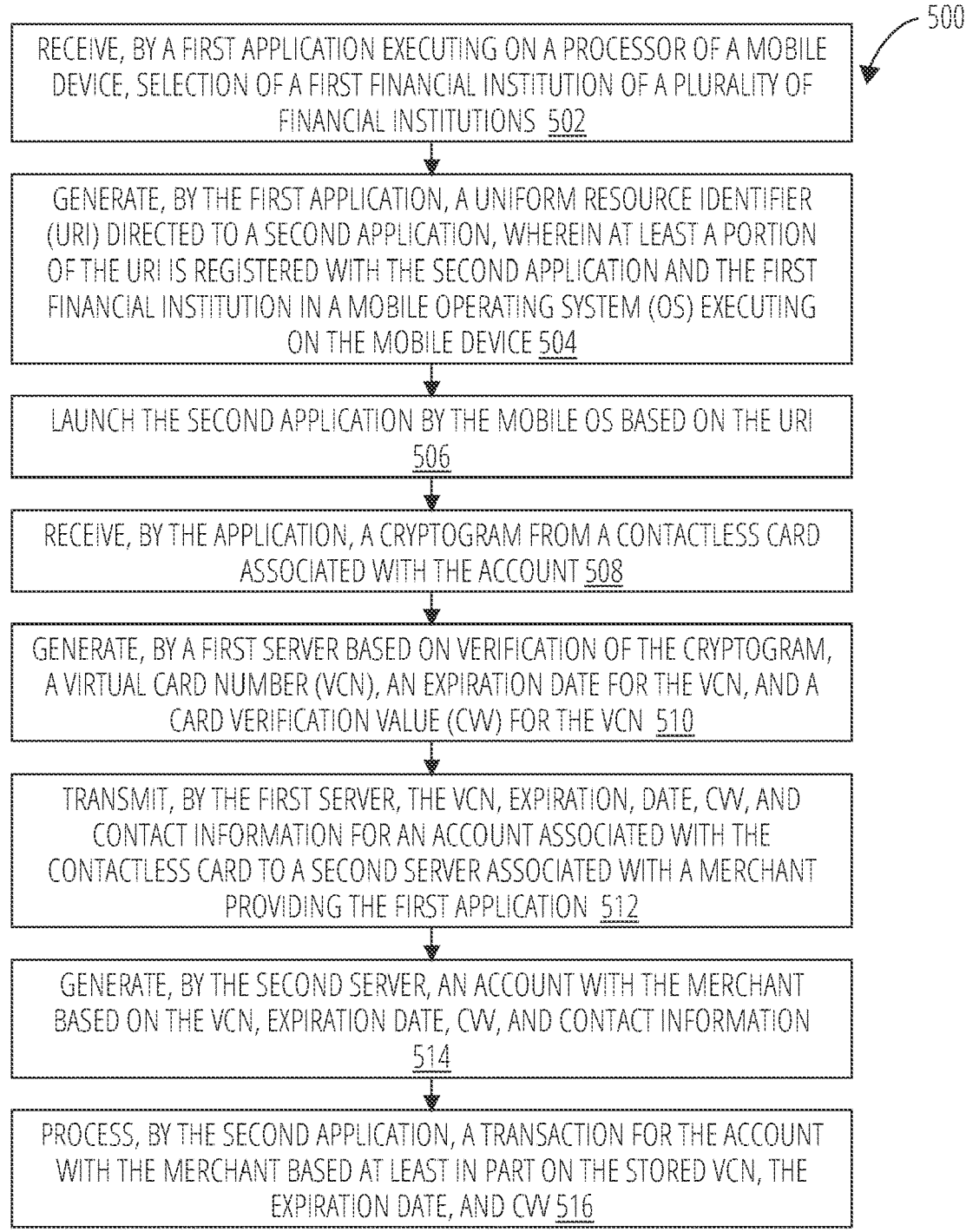
FIG. 5 illustrates a routine 500 in accordance with one embodiment.

FIG. 5 illustrates an embodiment of a logic flow, or routine, 500. The logic flow 500 may be representative of some or all of the operations executed by one or more embodiments described herein. For example, the logic flow 500 may include some or all of the operations for secure authentication and checkout in a dedicated merchant application using a contactless card 104. Embodiments are not limited in this context.

As stated, the web browser 140 is representative of any type of application. Therefore, FIG. 5 reflects an embodiment where dedicated applications are used for secure authentication and checkout using the contactless card 104. In block 502, routine 500 receives, by a first application executing on a processor of a mobile device, selection of a first financial institution of a plurality of financial institutions. In block 504, routine 500 generates, by the first application, a uniform resource identifier (URI) directed to a second application, wherein at least a portion of the URI is registered with the second application and the first financial institution in a mobile operating system (OS) executing on the mobile device. The URI may include the parameters of the URI 144, e.g., a user ID, session ID, a merchant ID, and/or an action ID.

In block 506, routine 500 launches the second application by the mobile OS based on the URI. In block 508, routine 500 receives, by the second application, a cryptogram from a contactless card associated with an account. The second application may transmit the cryptogram and any URI parameters to a first server associated with an issuer of the contactless card. In block 510, routine 500 generates, by the first server based on verification of the cryptogram, a virtual card number (VCN), an expiration date for the VCN, and a card verification value (CVV) for the VCN. In block 512, routine 500 transmits, by the first server, the VCN, expiration, date, CVV, and contact information for an account associated with the contactless card to a second server associated with a merchant providing the first application. The first server may further transmit the user ID, session ID, a merchant ID, and/or an action ID to the second server. In block 514, routine 500 generates, by the second server, an account with the merchant based on the VCN, expiration date, CVV, and contact information. Doing so allows the second server to store the payment information for later use. In block 516, routine 500 processes, by the second application, a transaction for the account with the merchant based at least in part on the stored VCN, the expiration date, and CVV. For example, at a later time, a user may log into their account with the merchant in the first application. The user may specify to purchase a sandwich with the merchant in the first application. Without having to provide payment information into the first application, the merchant may process the purchase of the sandwich using the stored VCN, expiration date, CVV associated with the account.

Figure 6A:
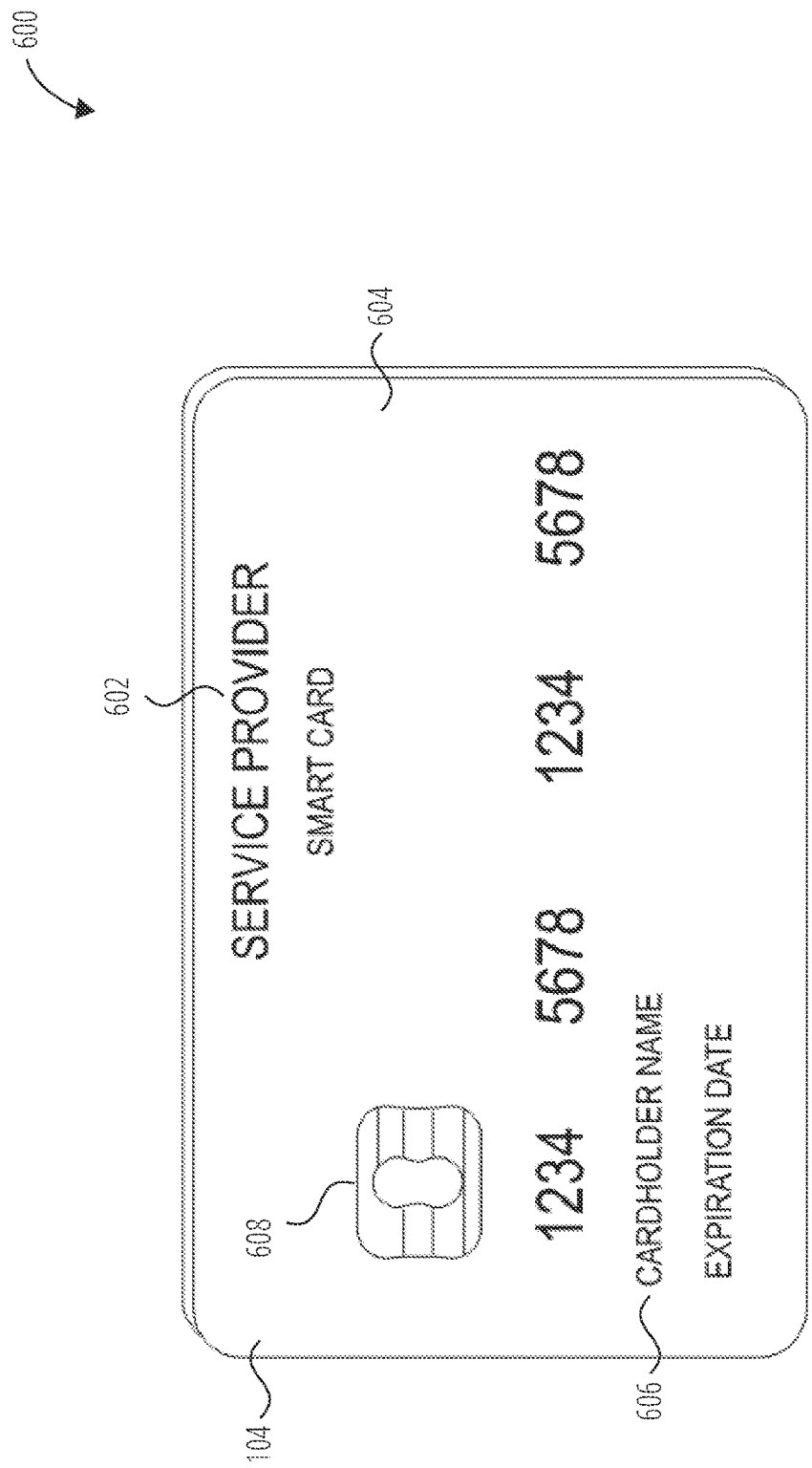
FIG. 6A illustrates a contactless card in accordance with one embodiment.

FIG. 6A is a schematic 600 illustrating an example configuration of a contactless card 104, which may include a payment card, such as a credit card, debit card, or gift card, issued by a service provider as displayed as service provider indicia 602 on the front or back of the contactless card 104. In some examples, the contactless card 104 is not related to a payment card, and may include, without limitation, an identification card. In some examples, the transaction card may include a dual interface contactless payment card, a rewards card, and so forth. The contactless card 104 may include a substrate 604, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 104 may have physical characteristics compliant with the ID-1 format of the ISO/IEC 7816 standard, and the transaction card may otherwise be compliant with the ISO/IEC 14443 standard. However, it is understood that the contactless card 104 according to the present disclosure may have different characteristics, and the present disclosure does not require a transaction card to be implemented in a payment card.

The contactless card 104 may also include identification information 606 displayed on the front and/or back of the card, and a contact pad 608. The contact pad 608 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 104 may also include processing circuitry, antenna and other components as will be further discussed in FIG. 6B. These components may be located behind the contact pad 608 or elsewhere on the substrate 604, e.g. within a different layer of the substrate 604, and may electrically and physically coupled with the contact pad 608. The contactless card 104 may also include a magnetic strip or tape, which may be located on the back of the card (not shown in FIG. 6A). The contactless card 104 may also include a Near-Field Communication (NFC) device coupled with an antenna capable of communicating via the NFC protocol. Embodiments are not limited in this manner.

Figure 6B:
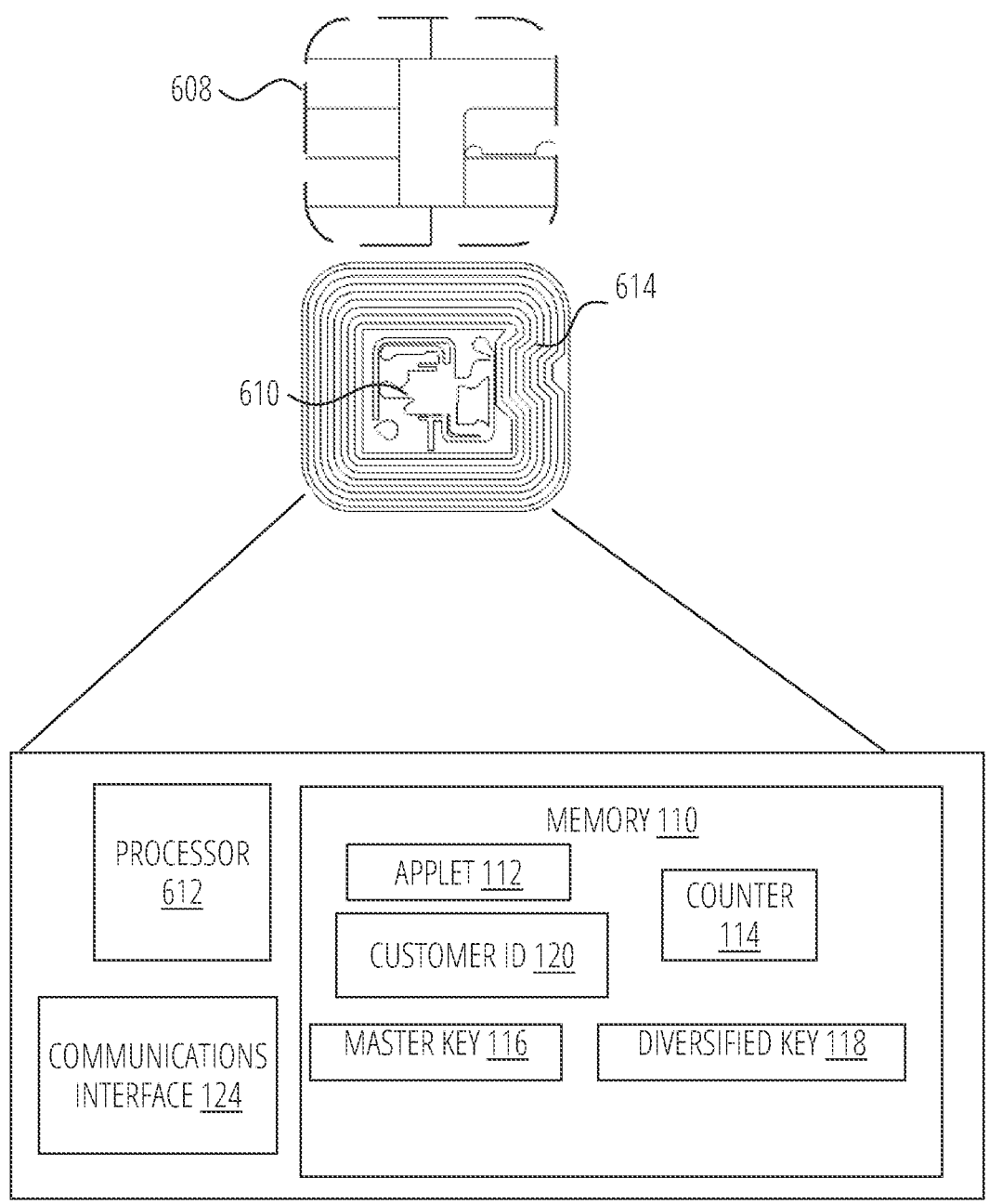
FIG. 6B illustrates a contactless card in accordance with one embodiment.

As illustrated in FIG. 6B, the contact pad 608 of contactless card 104 may include processing circuitry 610 for storing, processing, and communicating information, including a processor 612, a memory 110, and one or more communications interface 124. It is understood that the processing circuitry 610 may contain additional components, including processors, memories, error and parity/CRC checkers, data encoders, anticollision algorithms, controllers, command decoders, security primitives and tamper-proofing hardware, as necessary to perform the functions described herein.

The memory 110 may be a read-only memory, write-once read-multiple memory or read/write memory, e.g., RAM, ROM, and EEPROM, and the contactless card 104 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 110 may be encrypted memory utilizing an encryption algorithm executed by the processor 612 to encrypted data.

The memory 110 may be configured to store one or more applet 112, one or more counters 114, a customer ID 120, one or more master keys 116, and one or more diversified keys 118. The one or more applet 112 may comprise one or more software applications configured to execute on one or more contactless cards 104, such as a Java® Card applet. However, it is understood that applet 112 are not limited to Java Card applets, and instead may be any software application operable on contactless cards or other devices having limited memory. The one or more counter 114 may comprise a numeric counter sufficient to store an integer. The customer ID 120 may comprise a unique alphanumeric identifier assigned to a user of the contactless card 104, and the identifier may distinguish the user of the contactless card 104 from other users of other contactless cards 104. In some examples, the customer ID 120 may identify both a customer and an account assigned to that customer and may further identify the contactless card 104 associated with the customer's account.

The processor 612 and memory elements of the foregoing exemplary embodiments are described with reference to the contact pad 608, but the present disclosure is not limited thereto. It is understood that these elements may be implemented outside of the contact pad 608 or entirely separate from it, or as further elements in addition to processor 612 and memory 110 elements located within the contact pad 608.

In some examples, the contactless card 104 may comprise one or more antenna(s) 614. The one or more antenna(s) 614 may be placed within the contactless card 104 and around the processing circuitry 610 of the contact pad 608. For example, the one or more antenna(s) 614 may be integral with the processing circuitry 610 and the one or more antenna(s) 614 may be used with an external booster coil. As another example, the one or more antenna(s) 614 may be external to the contact pad 608 and the processing circuitry 610.

In an embodiment, the coil of contactless card 104 may act as the secondary of an air core transformer. The terminal may communicate with the contactless card 104 by cutting power or amplitude modulation. The contactless card 104 may infer the data transmitted from the terminal using the gaps in the power connection of the contactless card 104, which may be functionally maintained through one or more capacitors. The contactless card 104 may communicate back by switching a load on the coil of the contactless card 104 or load modulation. Load modulation may be detected in the terminal's coil through interference. More generally, using the antenna(s) 614, processor 612, and/or the memory 110, the contactless card 104 provides a communications interface to communicate via NFC, Bluetooth, and/or Wi-Fi communications.

As explained above, contactless card 104 may be built on a software platform operable on smart cards or other devices having limited memory, such as JavaCard, and one or more or more applications or applets may be securely executed. Applet 112 may be added to contactless cards to provide a one-time password (OTP) for multifactor authentication (MFA) in various mobile application-based use cases. Applet 112 may be configured to respond to one or more requests, such as near field data exchange requests, from a reader, such as a mobile NFC reader (e.g., of a mobile computing device 102 or point-of-sale terminal), and produce an NDEF message that comprises a cryptographically secure OTP encoded as an NDEF text tag. The NDEF message may include the cryptogram 122, and any other data.

One example of an NDEF OTP is an NDEF short-record layout (SR=1). In such an example, one or more applet 112 may be configured to encode the OTP as an NDEF type 4 well known type text tag. In some examples, NDEF messages may comprise one or more records. The applet 112 may be configured to add one or more static tag records in addition to the OTP record.

In some examples, the one or more applet 112 may be configured to emulate an RFID tag. The RFID tag may include one or more polymorphic tags. In some examples, each time the tag is read, different cryptographic data is presented that may indicate the authenticity of the contactless card. Based on the one or more applet 112, an NFC read of the tag may be processed, the data may be transmitted to a server, such as a server of a banking system, and the data may be validated at the server.

In some examples, the contactless card 104 and server may include certain data such that the card may be properly identified. The contactless card 104 may include one or more unique identifiers (not pictured). Each time a read operation takes place, the counter 114 may be configured to increment. In some examples, each time data from the contactless card 104 is read (e.g., by a mobile device), the counter 114 is transmitted to the server for validation and determines whether the counter 114 are equal (as part of the validation) to a counter of the server.

The one or more counter 114 may be configured to prevent a replay attack. For example, if a cryptogram has been obtained and replayed, that cryptogram is immediately rejected if the counter 114 has been read or used or otherwise passed over. If the counter 114 has not been used, it may be replayed. In some examples, the counter that is incremented on the contactless card 104 is different from the counter that is incremented for transactions. The contactless card 104 is unable to determine the application transaction counter 114 since there is no communication between applets 112 on the contactless card 104. In some examples, the contactless card 104 may comprise a first applet 440-1, which may be a transaction applet, and a second applet 440-2. Each applet 440-1 and 440-2 may comprise a respective counter 114.

In some examples, the counter 114 may get out of sync. In some examples, to account for accidental reads that initiate transactions, such as reading at an angle, the counter 114 may increment but the application does not process the counter 114. In some examples, when the mobile device 10 is woken up, NFC may be enabled and the computing device 102 may be configured to read available tags, but no action is taken responsive to the reads.

To keep the counter 114 in sync, an application, such as a background application, may be executed that would be configured to detect when the computing device 102 wakes up and synchronize with the server of a banking system indicating that a read that occurred due to detection to then move the counter 114 forward. In other examples, Hashed One Time Password may be utilized such that a window of mis-synchronization may be accepted. For example, if within a threshold of 10, the counter 114 may be configured to move forward. But if within a different threshold number, for example within 10 or 1000, a request for performing re-synchronization may be processed which requests via one or more applications that the user tap, gesture, or otherwise indicate one or more times via the user's device. If the counter 114 increases in the appropriate sequence, then it possible to know that the user has done so.

The key diversification technique described herein with reference to the counter 114, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 104, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 104. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 104 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 7:
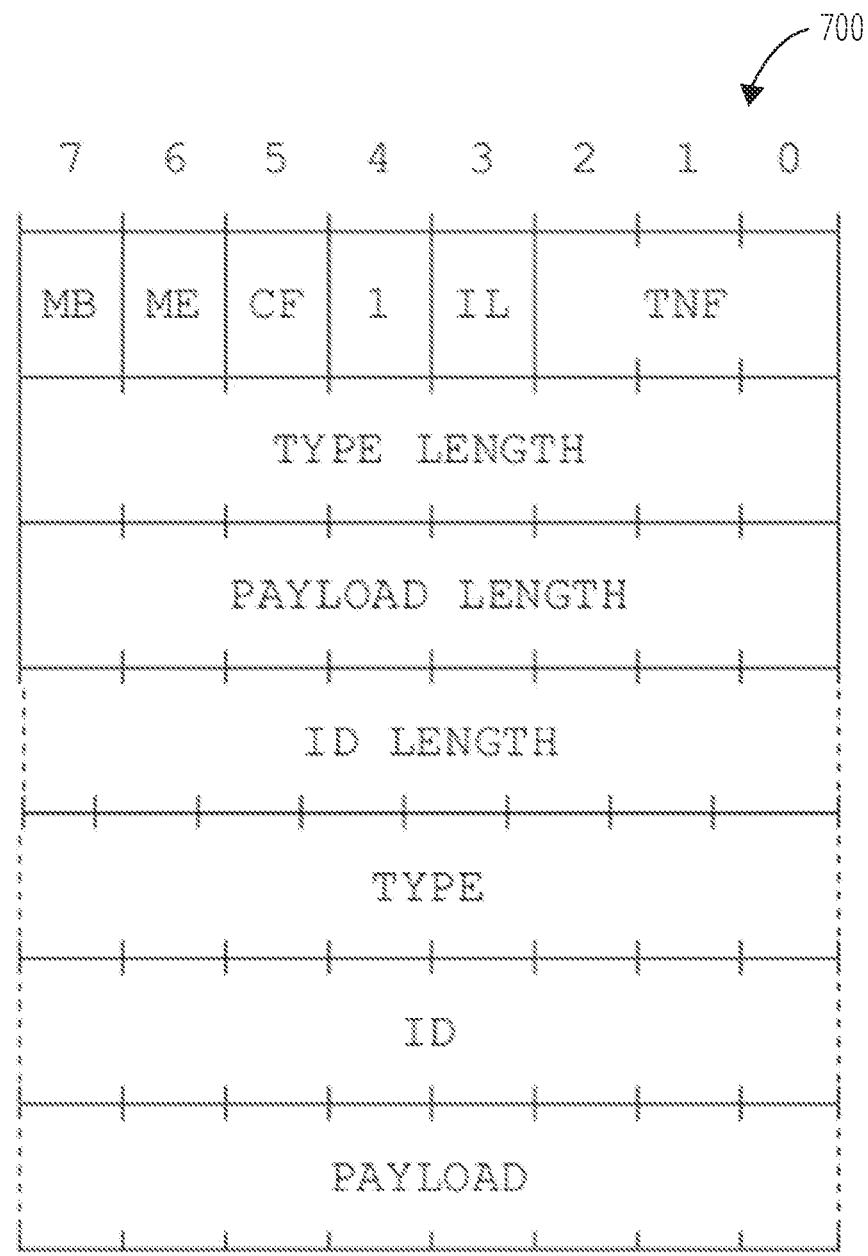
FIG. 7 illustrates a data structure 700 in accordance with one embodiment.

FIG. 7 illustrates an NDEF short-record layout (SR=1) data structure 700 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data. The data structure 700 may include the cryptogram 122, and any other data provided by the applet 112.

Figure 8:
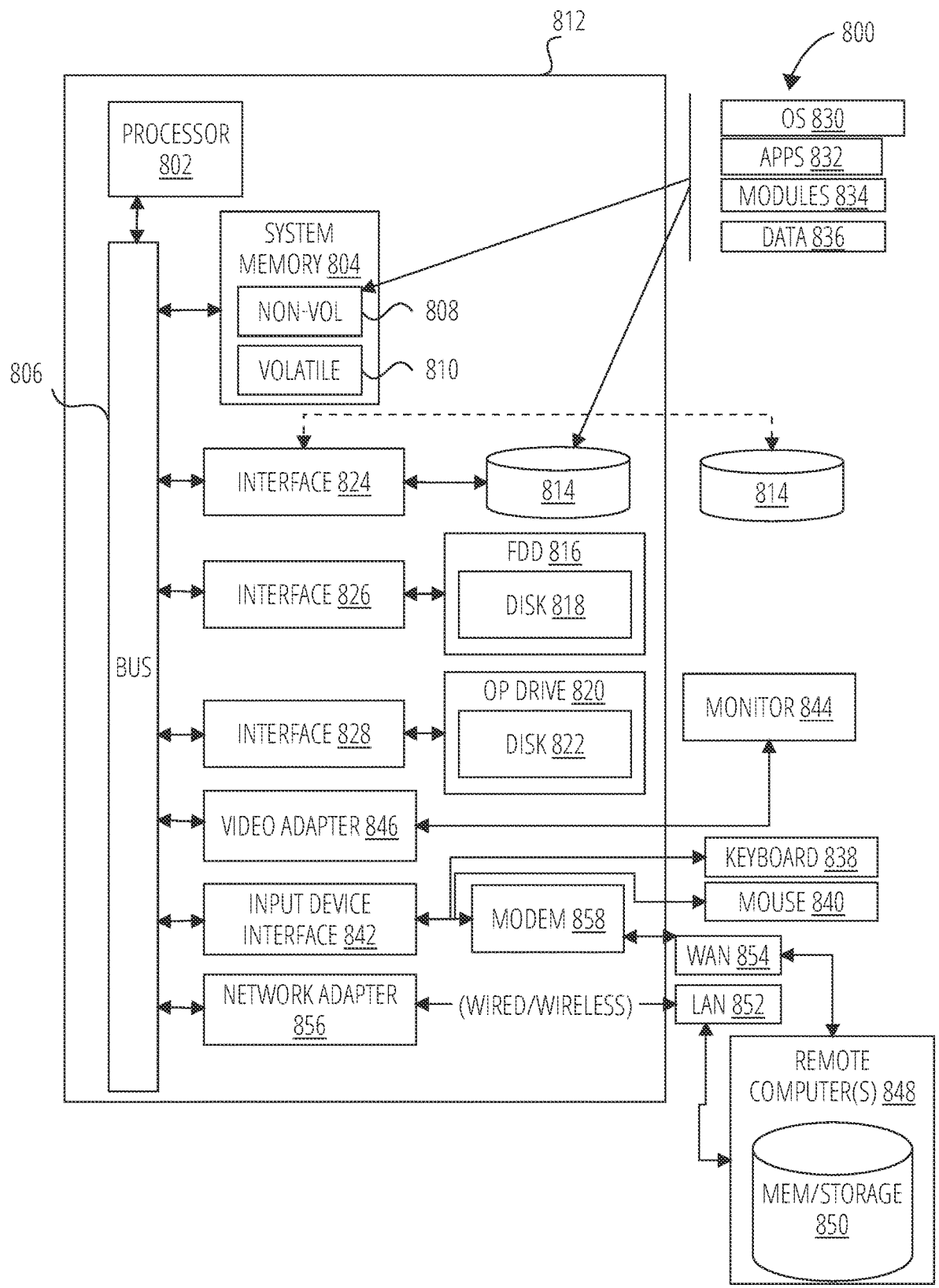
FIG. 8 illustrates a computer architecture 800 in accordance with one embodiment.

FIG. 8 illustrates an embodiment of an exemplary computer architecture 800 suitable for implementing various embodiments as previously described. In one embodiment, the computer architecture 800 may include or be implemented as part of computing architecture 100.

As used in this application, the terms "system" and "component" are intended to refer to a computer-related entity, either hardware, a combination of hardware and software, software, or software in execution, examples of which are provided by the exemplary computing computer architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computer architecture 800 includes a computer 812 comprising a processor 802, a system memory 804 and a system bus 806. The processor 802 can be any of various commercially available processors. The computer 812 may be representative of the computing device 102 and/or the authentication server 106.

The system bus 806 provides an interface for system components including, but not limited to, the system memory 804 to the processor 802. The system bus 806 can be any of several types of bus structure that may further interconnect to a memory bus (with or without a memory controller), a peripheral bus, and a local bus using any of a variety of commercially available bus architectures. Interface adapters may connect to the system bus 806 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile 808 and/or volatile 810. A basic input/output system (BIOS) can be stored in the non-volatile 808.

The computer 812 may include various types of computer-readable storage media in the form of one or more lower speed memory units, including an internal (or external) hard disk drive 814, a magnetic disk drive 816 to read from or write to a removable magnetic disk 818, and an optical disk drive 820 to read from or write to a removable optical disk 822 (e.g., a CD-ROM or DVD). The hard disk drive 814, magnetic disk drive 816 and optical disk drive 820 can be connected to system bus 806 the by an HDD interface 824, and FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 808, and volatile 810, including an operating system 830, one or more applications 832, other program modules 834, and program data 836. In one embodiment, the one or more applications 832, other program modules 834, and program data 836 can include, for example, the various applications and/or components of the system 100.

A user can enter commands and information into the computer 812 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 802 through an input device interface 842 that is coupled to the system bus 806 but can be connected by other interfaces such as a parallel port, IEEE 1394 serial port, a game port, a USB port, an IR interface, and so forth.

A monitor 844 or other type of display device is also connected to the system bus 806 via an interface, such as a video adapter 846. The monitor 844 may be internal or external to the computer 812. In addition to the monitor 844, a computer typically includes other peripheral output devices, such as speakers, printers, and so forth.

The computer 812 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all the elements described relative to the computer 812, although, for purposes of brevity, only a memory and/or storage device 850 is illustrated. The logical connections depicted include wire/wireless connectivity to a local area network 852 and/or larger networks, for example, a wide area network 854. Such LAN and WAN networking environments are commonplace in offices and companies, and facilitate enterprise-wide computer networks, such as intranets, all of which may connect to a global communications network, for example, the Internet.

When used in a local area network 852 networking environment, the computer 812 is connected to the local area network 852 through a wire and/or wireless communication network interface or network adapter 856. The network adapter 856 can facilitate wire and/or wireless communications to the local area network 852, which may also include a wireless access point disposed thereon for communicating with the wireless functionality of the network adapter 856.

When used in a wide area network 854 networking environment, the computer 812 can include a modem 858, or is connected to a communications server on the wide area network 854 or has other means for establishing communications over the wide area network 854, such as by way of the Internet. The modem 858, which can be internal or external and a wire and/or wireless device, connects to the system bus 806 via the input device interface 842. In a networked environment, program modules depicted relative to the computer 812, or portions thereof, can be stored in the remote memory and/or storage device 850. It will be appreciated that the network connections shown are exemplary and other means of establishing a communications link between the computers can be used.

The computer 812 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, ac, ax, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-7 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
   receiving, by a merchant web page in a web browser executing on a processor of a mobile device, selection of a first financial institution of a plurality of financial institutions, wherein the merchant web page includes a plurality of form fields associated with a transaction;
   generating, by the merchant web page, a link directed to an application based on the selection of the first financial institution, wherein the link comprises a session identifier (ID) parameter associated with the transaction and a user ID parameter, wherein at least a portion of the link is registered with the application and the first financial institution in a mobile operating system (OS) executing on the mobile device;
   responsive to receiving selection of the link, launching the application by the mobile OS;
   authenticating, by the application, login credentials for an account associated with the first financial institution;
   associating, by the application, the user ID parameter and the session ID parameter with the account;
   receiving, by the application, encrypted data from a contactless card associated with the account with an identifier associated with the contactless card, the encrypted data generated by an applet executing on the contactless card when the contactless card is tapped to the mobile device, and transmitting the encrypted data to a server for verification;
   receiving, by the application from the server, an indication specifying the server verified the encrypted data, wherein the verification is based on the identifier associated with the contactless card;
   launching, by the mobile OS based on the indication, the web browser;
   receiving, by the merchant web page from the server, payment information including a virtual card number (VCN) based on the verification of the encrypted data;
   refreshing, by the web browser, the merchant web page, wherein the refreshed merchant web page includes the payment information including the VCN automatically populated in a first form field of the plurality of form fields; and
   processing, by the merchant web page, the transaction based at least in part on the VCN in the first form field.

2. The method of claim 1, wherein associating the user ID parameter and the session ID parameter with the account comprises:
   associating, by the application, the user ID parameter and the session ID parameter with the account in: (i) an account database stored on the mobile device, or (ii) an account database stored by the server, wherein associating the user ID parameter and the session ID parameter with the account associates the account with a browsing session for the transaction in the web browser.

3. The method of claim 1, wherein the link further comprises a merchant ID parameter of a merchant associated with the merchant web page and an action ID parameter, wherein the VCN is generated by the server based on the authentication of the login credentials and the verification of the encrypted data, wherein use of the VCN is restricted to a merchant associated with the merchant web page, wherein the server transmits the VCN to a merchant server associated with the merchant, wherein the application loads an authentication page of the application based on the action ID parameter.

4. The method of claim 3, further comprising:
   transmitting, by the application, the user ID parameter, the session ID parameter, the merchant ID parameter, and the action ID parameter to the server, wherein the server further generates the VCN based on the user ID parameter, the session ID parameter, the merchant ID parameter, and the action ID parameter.

5. The method of claim 1, further comprising prior to processing the transaction:

receiving, by the mobile device, a notification from one or more of: (i) a merchant server associated with the merchant web page, or (ii) the server, wherein the notification is received based on the transaction not being processed within a threshold amount of time relative to generation of the VCN.

6. The method of claim 1, wherein the link is a universal link or an app link directed to the application, the method further comprising prior to launching the application:

determining, by the mobile OS, that the application is not installed on the mobile device;

downloading, by the mobile OS, the application; and installing, by the mobile OS, the application on the mobile device.

7. The method of claim 1, wherein the web browser determines the application is installed on the mobile device based on a function provided by the mobile OS, wherein the refreshed merchant web page further includes: (i) a name associated with the account in a second form field of the plurality of form fields, (ii) an expiration date associated with the VCN in a third form field of the plurality of form fields, (iii) a card verification value (CVV) associated with the VCN in a fourth form field of the plurality of form fields, (iv) a phone number associated with the account in a fifth form field of the plurality of form fields, and (v) an email address associated with the account in a sixth form field of the plurality of form fields.

8. The method of claim 1, wherein one or more of the OS or the web browser restricts the application from directly providing the VCN to the web browser.

9. A non-transitory computer-readable storage medium, the computer-readable storage medium including instructions that when executed by a processor of a mobile device, cause the processor to:

receive, by a merchant web page in a web browser, selection of a first financial institution of a plurality of financial institutions, wherein the merchant web page includes a plurality of form fields associated with a transaction;

generate, by the merchant web page, a link directed to an application based on the selection of the first financial institution, wherein the link comprises a session identifier (ID) parameter associated with the transaction and a user ID parameter, wherein at least a portion of the link is registered with the application and the first financial institution in a mobile operating system (OS) executing on the mobile device;

responsive to receiving selection of the link, launch the application by the mobile OS;

authenticate, by the application, login credentials for an account associated with the first financial institution;

associate, by the application, the user ID parameter and the session ID parameter with the account;

receive, by the application, encrypted data from a contactless card associated with the account with an identifier associated with the contactless card, the encrypted data generated by an applet executing on the contactless card when the contactless card is tapped to the mobile device, and transmit the encrypted data to a server for verification;

receive, by the application from the server, an indication specifying the server verified the encrypted data, wherein the verification is based on the identifier associated with the contactless card;

launch, by the mobile OS based on the indication, the web browser;

receive, by the merchant web page from the server, payment information including a virtual card number (VCN) based on the verification of the encrypted data;

refresh, by the web browser, the merchant web page, wherein the refreshed merchant web page includes the payment information including the VCN automatically populated in a first form field of the plurality of form fields; and process, by the merchant web page, the transaction based at least in part on the VCN in the first form field.

10. The non-transitory computer-readable storage medium of claim 9, wherein associating the user ID parameter and the session ID parameter with the account comprises:

associating, by the application, the user ID parameter and the session ID parameter with the account in: (i) an account database stored on the mobile device, or (ii) an account database stored by the server, wherein associating the user ID parameter and the session ID parameter with the account associates the account with a browsing session for the transaction in the web browser.

11. The non-transitory computer-readable storage medium of claim 9, wherein the link further comprises a merchant ID parameter of a merchant associated with the merchant web page and an action ID parameter, wherein the VCN is generated by the server based on the authentication of the login credentials and the verification of the encrypted data, wherein use of the VCN is restricted to a merchant associated with the merchant web page, wherein the server transmits the VCN to a merchant server associated with the merchant, wherein the application loads an authentication page of the application based on the action ID parameter.

12. The non-transitory computer-readable storage medium of claim 11, wherein the instructions further cause the processor to:

transmit, by the application, the user ID parameter, the session ID parameter, the merchant ID parameter, and the action ID parameter to the server, wherein the server further generates the VCN based on the user ID parameter, the session ID parameter, the merchant ID parameter, and the action ID parameter.

13. The non-transitory computer-readable storage medium of claim 9, wherein the instructions further cause the processor to, prior to processing the transaction:

receive, by the mobile device, a notification from one or more of: (i) a merchant server associated with the merchant web page, or (ii) the server, wherein the notification is received based on the transaction not being processed within a threshold amount of time relative to generation of the VCN.

14. The non-transitory computer-readable storage medium of claim 9, wherein the link is a universal link or an app link directed to the application, wherein the instructions further cause the processor to, prior to launching the application:

determine, by the mobile OS, that the application is not installed on the mobile device;

download, by the mobile OS, the application; and install, by the mobile OS, the application on the mobile device.

15. A computing apparatus comprising:

a processor; and a memory storing instructions that, when executed by the processor, cause the processor to:

receive, by a merchant web page in a web browser, selection of a first financial institution of a plurality of financial institutions, wherein the merchant web page includes a plurality of form fields associated with a transaction;

generate, by the merchant web page, a link directed to an application based on the selection of the first financial institution, wherein the link comprises a session identifier (ID) parameter associated with the transaction and a user ID parameter, wherein at least a portion of the link is registered with the application and the first financial institution in a mobile operating system (OS) executing on the processor;

responsive to receiving selection of the link, launch the application by the mobile OS;

authenticate, by the application, login credentials for an account associated with the first financial institution;

associate, by the application, the user ID parameter and the session ID parameter with the account;

receive, by the application, encrypted data from a contactless card associated with the account with an identifier associated with the contactless card, the encrypted data generated by an applet executing on the contactless card when the contactless card is tapped to the mobile device, and transmit the encrypted data to a server for verification;

receive, by the application from the server, an indication specifying the server verified the encrypted data, wherein the verification is based on the identifier associated with the contactless card;

launch, by the mobile OS based on the indication, the web browser;

receive, by the merchant web page from the server, payment information including a virtual card number (VCN) based on the verification of the encrypted data;

refresh, by the web browser, the merchant web page, wherein the refreshed merchant web page includes the payment information including the VCN automatically populated in a first form field of the plurality of form fields; and process, by the merchant web page, the transaction based at least in part on the VCN in the first form field.

16. The computing apparatus of claim 15, wherein associating the user ID parameter and the session ID parameter with the account comprises:

associating, by the application, the user ID parameter and the session ID parameter with the account in: (i) an account database stored by the apparatus, or (ii) an account database stored by the server, wherein associating the user ID parameter and the session ID parameter with the account associates the account with a browsing session for the transaction in the web browser.

17. The computing apparatus of claim 15, wherein the link further comprises a merchant ID parameter of a merchant associated with the merchant web page and an action ID parameter, wherein the VCN is generated by the server based on the authentication of the login credentials and the verification of the encrypted data, wherein use of the VCN is restricted to a merchant associated with the merchant web page, wherein the server transmits the VCN to a merchant server associated with the merchant, wherein the application loads an authentication page of the application based on the action ID parameter.

18. The computing apparatus of claim 17, wherein the instructions further cause the processor to:

transmit, by the application, the user ID parameter, the session ID parameter, the merchant ID parameter, and the action ID parameter to the server, wherein the server further generates the VCN based on the user ID parameter, the session ID parameter, the merchant ID parameter, and the action ID parameter.

19. The computing apparatus of claim 15, wherein the instructions further cause the processor to, prior to processing the transaction:

receive a notification from one or more of: (i) a merchant server associated with the merchant web page, or (ii) the server, wherein the notification is received based on the transaction not being processed within a threshold amount of time relative to generation of the VCN.

20. The computing apparatus of claim 15, wherein the link is a universal link or an app link directed to the application, wherein the instructions further cause the processor to, prior to launching the application:

determine, by the mobile OS, that the application is not installed on the apparatus;

download, by the mobile OS, the application; and install, by the mobile OS, the application on the apparatus.

* * * * *